(12) United States Patent
Berstis

(10) Patent No.: US 7,208,730 B2
(45) Date of Patent: Apr. 24, 2007

(54) PROGRAMMABLE MOLECULAR MANIPULATING DEVICES

(75) Inventor: Viktors Berstis, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 10/965,173

(22) Filed: Oct. 14, 2004

(65) Prior Publication Data
US 2006/0097161 A1   May 11, 2006

(51) Int. Cl.
*H01J 37/26* (2006.01)
(52) U.S. Cl. .......................................... 250/306; 435/6
(58) Field of Classification Search ................ 250/306; 435/6; 436/518
See application file for complete search history.

(56) References Cited

U.S. PATENT DOCUMENTS

| | | | | |
|---|---|---|---|---|
| 5,730,940 A * | 3/1998 | Nakagawa | ................ | 422/68.1 |
| 5,744,799 A * | 4/1998 | Ohara | ........................ | 250/306 |
| 6,287,765 B1 * | 9/2001 | Cubicciotti | .................... | 435/6 |
| 6,312,960 B1 * | 11/2001 | Balch et al. | ................. | 436/518 |
| 6,475,730 B1 * | 11/2002 | Douglas et al. | ................ | 435/6 |
| 6,727,065 B2 * | 4/2004 | Weiss et al. | ................... | 435/6 |
| 6,803,238 B1 * | 10/2004 | Eggers | ....................... | 436/518 |

* cited by examiner

*Primary Examiner*—Nikita Wells
*Assistant Examiner*—Johnnie L Smith, II
(74) *Attorney, Agent, or Firm*—Joseph R. Burwell; Jeffrey S. LaBaw

(57) ABSTRACT

A system manipulates molecules using a set of proximal probes such as those used in atomic force microscopes. An electrostatic pattern is placed on a set of proximal probes such that each proximal probe may exert an electrostatic force. A molecule is captured using those electrostatic forces, after which the molecule can be manipulated while the molecule remains captured by the proximal probes. The electrostatic pattern can be modified such that the molecule moves and/or rotates over the set of proximal probes while the molecule remains captured by the set of proximal probes. The electrostatic pattern can be used to bend or split the molecule while the molecule remains captured by the set of proximal probes, thereby allowing the system to engage the molecule in chemical reactions, e.g., to act as a synthetic catalyst or a synthetic enzyme.

27 Claims, 8 Drawing Sheets

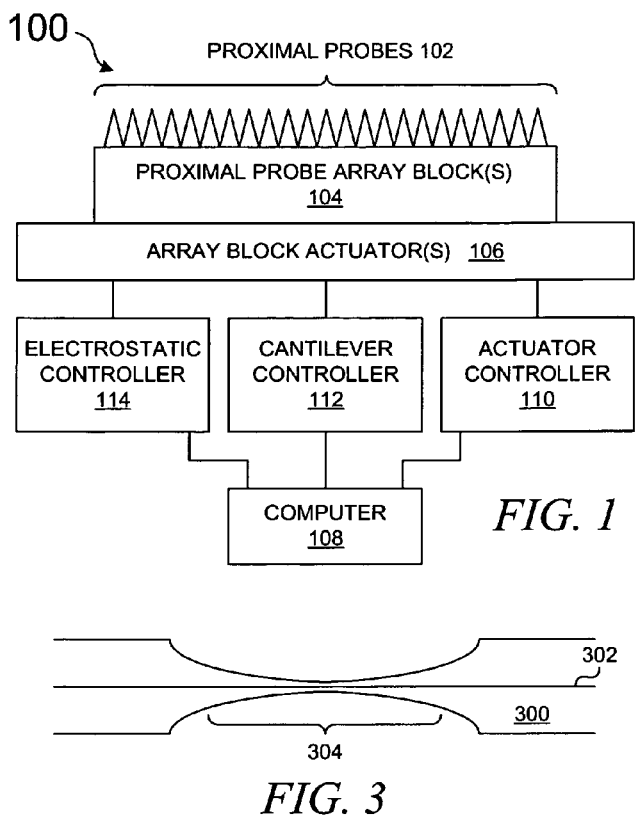
FIG. 1
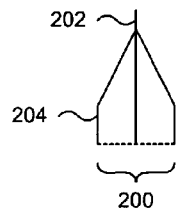
FIG. 2
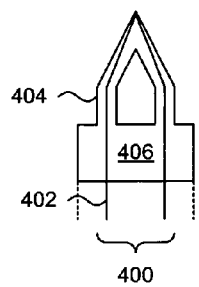
FIG. 4
FIG. 3
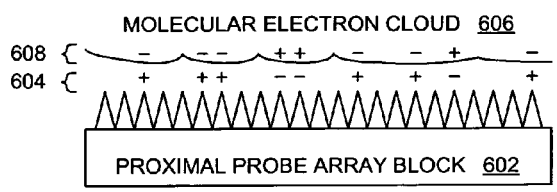
FIG. 6
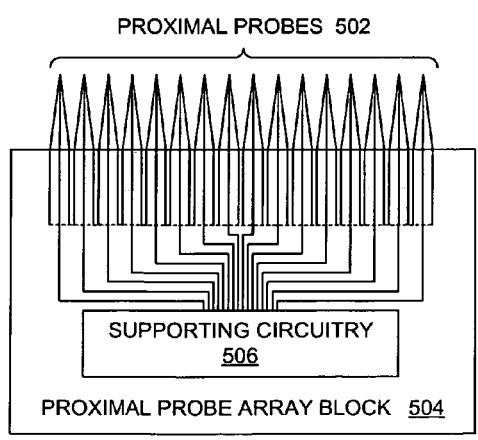
FIG. 5
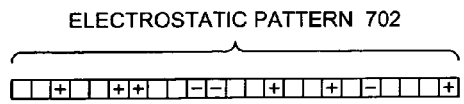
FIG. 7

PROGRAMMABLE MOLECULAR MANIPULATING DEVICES

CROSS-REFERENCE TO RELATED APPLICATIONS

The present application is related to the following application: application Ser. No. 10/965,112, filed Oct. 14, 2004, entitled "Programmable molecular manipulating processes", which is hereby incorporated by reference.

BACKGROUND OF THE INVENTION

1. Field of the Invention

The present invention relates generally to usage of proximal probes of atomic-scale precision for interactions with molecules.

2. Description of Related Art

Research discoveries continue to advance the knowledge of nanotechnology. Scientists are venturing into the realm of the almost indescribably tiny. In nanotechnology, everything can be described in terms of atomic interactions. At these dimensions, the distinctions between biology and physics are blurring, which increases the difficulty of nanotechnology because, despite the number of advances, scientists in their respective disciplines are encroaching upon each other's research domains. For example, to make tiny electronic circuits, some physicists have tried to mimic nature by causing inanimate matter to assemble itself in a manner that resembles biological processes.

The manipulation of matter at the atomic level is not new. In 1981, Gerd Binnig and Heinrich Rohrer at the IBM Research Laboratory in Zurich, Switzerland, invented and patented the scanning tunneling microscope (STM) (U.S. Pat. No. 4,343,993, herein incorporated by reference in its entirety for all purposes), which greatly advanced the ability to understand the microscopic world at the atomic level. The key component of an STM is an extremely sharp tip made from a metal such as tungsten mounted on an array of piezoelectric elements which control the tip's position in three dimensions. The STM can spatially control the tip very precisely, such as on the order of a nanometer with respect to a surface. At such tiny distances, currents can tunnel between the tip and the surface. As the tip is moved across the surface of the sample, its height is adjusted to keep the tunneling current at a constant amount such that the STM can image the electron clouds of the surface atoms in the sample. With pictures of the surface of inorganic materials such as metal and semiconductors, the STM gave scientists their first vision of the nanoworld. This work won Binnig and Rohrer the Nobel prize in 1986.

Despite its capabilities, the STM is limited to imaging conducting materials. To overcome this limitation, Binnig and others developed a related device to the STM called an atomic force microscope (AFM). This now well-known device senses the topography of a sample using a tiny tip mounted on the end of a minuscule, microfabricated cantilever. Rather than using the tunneling current, the sample is scanned by actually bringing the tip in contact with the sample surface, and the interaction of atomic forces between the nanometer-sharp tip and the sample surface causes pivotal deflections of the cantilever. The AFM measures the minute upward and downward deflections needed to maintain a constant force of contact. As the AFM relies on contact force, it can be used to image nonconducting materials such as organic or insulating materials.

Other variants of the STM and AFM have been developed. These devices can probe other aspects of materials at the molecular level such as magnetic and electrostatic forces, van der Waals interactions, temperature variations, optical absorption, near-field optics, and acoustics. These are collectively known as "proximal probes"; a variety of these probes are described in Pool, "Children of the STM", *Science*, v. 247, pp. 634–636 (1990).

As soon as scientists could see individual atoms, they could not resist playing with them. Proximal probe devices have been used to manipulate atoms and molecules essentially by picking them up with the scanning tip and moving them; e.g., see D. M. Eigler and E. K. Schweizer, "Positioning Single Atoms with a Scanning Tunneling Microscope", *Nature*, v. 344, pp. 524–526 (1990), which describes the positioning of xenon atoms on a nickel substrate to form the initials "IBM". Other STM images can be found in "STM Rounds Up Electron Waves at the QM Corral", *Physics Today*, v. 46, n. 11, pp. 17–19 (1993).

IBM and others have developed new applications for proximal probes technologies. With a team of colleagues in Zurich, Binnig has created a nanoscopic brush with over a thousand tiny tips, each on its own cantilever, in a "millipede" storage system. Using heater cantilevers, dents are made in a polymer material; such thermomechanical recording has been demonstrated at 400 gigabytes per square inch storage density. The tips are used for reading the dents as well; data rates of a few megabytes per second for reading and 100 kilobytes per second for writing have been demonstrated, as described in Binnig et al., "Ultrahigh-density Atomic Force Microscopy Data Storage with Erase Capability", *Applied Physics Letter*, v. 74, n. 9, pp. 1329–1331, May, 1, 1999, and Vettinger et al., "The Millipede—More Than One Thousand Tips for Future AFM Data Storage", IBM Journal of Research & Development, v. 44, n. 3, pp. 323–340, May 2000. A magnetic millipede which uses a magnetic substrate is described in Allenspach et al., U.S. Pat. No. 6,680,808, "Magnetic Millipede for Ultra High Density Magnetic Storage", herein incorporated by reference in its entirety for all purposes.

While most of Binnig's work has been based on mechanical principles, others are using natural processes for insights on how to manipulate matter. Angela Belcher at the University of Texas has used proteins to build new semiconductor materials. As an example, she studied abalone shell, which despite being made of two types of chalk, is about 3000 times as strong as the chalk found in rock; it is proteins produced by the abalone's RNA which determine how to optimally arrange the chalk molecules. Using this insight, she has assembled a set of proteins which control crystal growth in various ways. Some of this research is described in "Selection of Peptides with Semiconductor Binding Specificity for Directed Nanocrystal Assembly", *Nature*, v. 405, pp. 666–668 (8 Jun. 2000).

Like Belcher, Heller et al. has used chemical chains to interact with other molecules, as described in U.S. Pat. No. 5,605,662, "Active Programmable Electronic Devices for Molecular Biological Analysis and Diagnosis". In Heller et al., the chains are held in place by an array of microlocations (much larger than individual molecule size) which are set up to hold different chemical agents at each site which in turn bind to the molecules of interest. While this permits interesting programmability of what molecules are concentrated in which area, it does not manipulate the molecules individually but rather in bulk. Belcher and Heller et al. do not directly manipulate the molecules but rather indirectly affect the molecules using analytes, proteins, or their equivalents.

Researchers have also proposed combining the selection qualities of organic molecules and the positioning precision of proximal probes. Eric Drexler in *Nanosystems: Molecular Machinery, Manufacturing, and Computation*, Wiley Interscience (1992), proposed an AFM having multiple bead bound worksites comprising organic molecules on the probe surface. Harold Craighead and his team at Cornell University have attached antibodies to a proximal probe on a cantilever. With this device, they can detect the presence of particular bacteria. If present, the antibodies bond to the bacteria; as the probe is weighed down by the accumulation of bacteria, the resonant frequency of the vibrating cantilever is changed.

In living beings, most manipulations are driven by DNA, RNA, and special proteins which work on the principle of creating an electrostatic pattern of charges which closely match the complementary pattern of charges on the molecule to be manipulated, thereby allowing the appropriate molecule to be attached to an enzyme, catalyst, or other manipulating molecule. It would be advantageous to provide the ability to perform similar types of molecular manipulation using proximal probe technology.

SUMMARY OF THE INVENTION

A method, an apparatus, a system, and a computer program product are presented for manipulating molecules using a set of proximal probes, such as the proximal probes used in atomic force microscopes, electrostatic force microscopes, scanning tunneling microscopes, and the like. An electrostatic pattern is placed on a subset of two or more proximal probes in the set of proximal probes such that an end portion of each proximal probe in the subset of proximal probes exerts an electrostatic force. A molecule is captured using the electrostatic forces that are exerted by the electrostatic pattern, after which the molecule can be manipulated while the molecule remains captured by the set of proximal probes. The electrostatic pattern is modified to create a different electrostatic pattern on a different subset of two or more proximal probes in the set of proximal probes such that the molecule moves and/or rotates over the set of proximal probes while the molecule remains captured by the set of proximal probes. The electrostatic pattern can be used to bend or split the molecule while the molecule remains captured by the set of proximal probes, thereby allowing the system to engage the molecule in chemical reactions, e.g., to act as a synthetic catalyst or a synthetic enzyme.

One or more sets of proximal probes may also be mechanically and/or electrically manipulated as a group. As a set of proximal probes is manipulated, a captured molecule is moved with the set of proximal probes, thereby causing modifications to the captured molecule through mechanical actions or through chemical reactions.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIG. 1 depicts a block diagram that shows a data processing system for controlling a proximal probe array block in accordance with an embodiment of the present invention;

FIG. 2 depicts a diagram that shows a proximal probe with a conductive microtip for use in an implementation of the molecular manipulation system of the present invention;

FIG. 3 depicts a diagram that shows a manner for forming a glass-insulating proximal probe with a conducting microtip for use in an implementation of the molecular manipulation system of the present invention;

FIG. 4 depicts a diagram that shows a proximal probe with a cantilever having a conductive microtip for use in an implementation of the molecular manipulation system of the present invention;

FIG. 5 depicts a block diagram that shows a group of proximal probes that are assembled together to form a proximal probe array block in accordance with an embodiment of the present invention;

FIG. 6 depicts a diagram that shows a one-dimensional proximal probe array that is presenting an electrostatic pattern which is facing the electron cloud of a captured molecule in accordance with an embodiment of the present invention;

FIG. 7 depicts a diagram that shows a frontal, edge-on view of a one-dimensional proximal probe array block in accordance with an embodiment of the present invention;

DETAILED DESCRIPTION OF THE INVENTION

Figure 8:
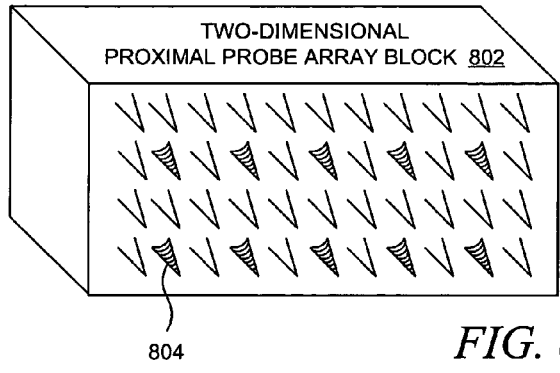
FIG. 8 depicts a diagram that shows a two-dimensional proximal probe array that can present an electrostatic pattern for attempting to capture a targeted molecule that exhibits an electron cloud that contains polarized locations in accordance with an embodiment of the present invention.
Figure 8:
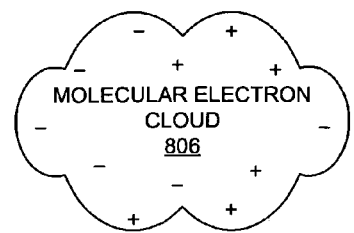

With reference now to FIG. 1, a block diagram depicts a data processing system for controlling a proximal probe array block in accordance with an embodiment of the present invention. In contrast to prior art usage of proximal probes, the present invention employs a set of two or more proximal probes in programmable molecular manipulation system 100; an arrangement of proximal probes is termed a "proximal probe array". In a preferred embodiment, a set of proximal probes are aligned in a regular or uniform manner to form an array of proximal probes; in an alternative embodiment, the set of proximal probes may have irregular spacing or inter-probe gaps. The exemplary figures herein depict a proximal probe as a tetrahedron, but the present invention may be implemented using proximal probes of different shapes and sizes. For example, a type of proximal probe is disclosed in Bayer et al., "Micromechanical sensor for AFM/STM profilometry", U.S. Pat. No. 6,091,124, issued Jul. 18, 2000, herein incorporated by reference in its entirety for all purposes; a different type of proximal probe is disclosed in Doezema et al., "Silicided silicon microtips for scanning probe microscopy", U.S. Pat. No. 6,198,300, issued Mar. 6, 2001, herein incorporated by reference in its entirety for all purposes. As another example, each proximal probe may comprise at least one buckytube or nanotube form of carbon, silicon nanotube, or a nanotube that is made of some other element, as well as polymers.

An assembly of proximal probes 102 forms proximal probe array block(s) 104, which may include supporting structure and/or supporting circuitry in addition to the proximal probes themselves; an embodiment of the present invention may employ a plurality of proximal probe array blocks, each of which is associated with one or more actuator(s)/servo(s) 106 such that a proximal probe array block can be translated in at least one spatial dimensional but preferably three spatial dimensions as well as rotated about the three spatial axes. It should be noted that the figures that are described herein are not drawn to scale.

Computer 108 sends commands to actuator controller 110, which controls array block actuator(s) 106. Computer 108 has a computer-human interface with a display monitor and input devices for allowing a user to operate molecular manipulation system 100; a user may also invoke special software applications that execute on computer 108 to automate the usage of molecular manipulation system 100. The present invention may be implemented using different types of actuators, servo motors, or piezoelectric controllers that allow management of the movement at an atomic scale, possibly with laser-assisted guidance. For example, a type of servo controller is disclosed in Mamin et al., "Atomic force microscopy data storage system with tracking servo from lateral force-sensing cantilever", U.S. Pat. No. 5,856,967, issued Jan. 5, 1999, herein incorporated by reference in its entirety for all purposes.

In addition to moving the proximal probes by moving the proximal probe array blocks in which the proximal probes are assembled, the proximal probes may be implemented to include cantilevers, as explained in more detail hereinbelow. If so included, each cantilever associated with a proximal probe is controlled through cantilever controller 112, which may be commanded by computer 108.

The programmable molecular manipulation system of the present invention employs electrostatic force via proximal probes for the manipulation of molecules. Electrostatic controller 114, which may also be commanded by computer 108, controls the amount of voltage (possibly in addition to other physical variables, such as electric current) that is experienced by each proximal probe, thereby controlling the electrostatic force that is presented by the tip of each proximal probe, as explained in more detail hereinbelow. In addition, computer 108 may work with other controller elements. Electrostatic controller 114 or some other controller may also provide for magnetic manipulation of molecules, either for assistance in manipulating a molecule primarily through electrostatic forces or for direct manipulation of a molecule; for example, a proximal probe may comprise a small loop of conducting material that carries an electric current to present a small magnetic field toward a molecule.

With reference now to FIG. 2, a diagram depicts a proximal probe with a conductive microtip for use in an implementation of the molecular manipulation system of the present invention. As noted above, the proximal probes of the present invention may be implemented in a variety of forms. FIG. 2 depicts a tip of a proximal probe that does not include a cantilever, whereas FIG. 4 depicts a tip of a proximal probe that does include a cantilever; in each case, the tip of the proximal probe refers to the portion of the proximal probe that expresses an electrostatic charge that in order to impart an electrostatic force on a molecule. However, the description of the figures hereinbelow may simply describe the proximal probe expressing an electrostatic charge without reference to the tip at the end of the proximal probe. Referring to FIG. 2, tip 200 comprises conductive wire/lead 202 that forms an atomically sharp microtip; conductive lead 202 is centered within insulating material or semiconductor material 204. In FIG. 2, tip 200 has been truncated for purposes of illustration; FIG. 2 shows either a side view of tip 200 or a center-cut view of tip 200.

With reference now to FIG. 3, a diagram depicts a manner for forming a glass-insulating proximal probe with a conducting microtip for use in an implementation of the molecular manipulation system of the present invention. Glass rod 300 contains conductive lead/wire 302 that is centered within glass rod 300. Glass rod 300 has been heated in region 304 to make it soft and pliable, and it has been stretched to elongate region 304, thereby making glass rod 300 and its conductive lead/wire 302 much thinner in region 304. Glass rod 300 can be cut within region 304 such that a microtip is formed in which only a microscopic portion of conductive wire 302 is exposed, e.g., similar to that shown in FIG. 2. The process that is described with respect to FIG. 3 may be performed on multiple glass rods simultaneously such that an assembly of multiple proximal probes are manufactured more efficiently; in other words, a proximal probe array block can be manufactured in a single operation as described above.

With reference now to FIG. 4, a diagram depicts a proximal probe with a cantilever having a conductive microtip for use in an implementation of the molecular manipulation system of the present invention. Tip 400 comprises conductive lead 402 that forms an atomically sharp microtip at the end of cantilever 404; conductive wire/lead 402 is contained within the insulating material or the semiconductor material of cantilever 404. In FIG. 4, tip 400 has been truncated for purposes of illustration; FIG. 4 shows either a side view of tip 400 or a center-cut view of tip 400. Cantilever base 406 contains structure for moving cantilever 404, which may be implemented in a variety of different manners. Information for cantilevers on electrostatic proximal probes is disclosed in Itoh et al., "Electrostatic force detector with cantilever for an electrostatic force microscope", U.S. Pat. No. 6,507,197, issued Jan. 14, 2003, herein incorporated by reference in its entirety for all purposes; further detail concerning structures of cantilevers for proximal probes is disclosed in U.S. Pat. No. 5,856,967, referenced above.

With reference to FIG. 5, a block diagram depicts a group of proximal probes that are assembled together to form a proximal probe array block in accordance with an embodiment of the present invention. FIG. 5 further illustrates the manner in which proximal probes that are depicted in FIG. 2 and FIG. 4 can be grouped together to form a proximal probe array block as depicted in FIG. 1. Proximal probes 502 are assembled to form proximal probe array block 504. It should be noted, however, that a proximal probe array block is not necessarily made from the gathering of individual proximal probes. Moreover, a proximal probe array block may be manufactured using lithography, gas deposition, laser ablation, or some other technique.

Conductive wires/leads from each proximal probe are connected to supporting circuitry; FIG. 5 depicts supporting circuitry 506 within proximal probe array block 504, but the supporting circuitry may be located outside of the proximal probe array block such that only conductive connections are located within the proximal probe array block. Conductive wires/leads may include wires for placing, i.e. asserting or inducing, an electrostatic potential at the tip of a proximal probe, wires for controlling a cantilever of a proximal probe, wires for sensors, wires for manipulative control of a structure of proximal probe, wires for manipulative control of a portion of a substrate of a proximal probe array block, and/or wires for other purposes. Supporting circuitry 506 would be connected as necessary to higher-level controllers, such as those shown in FIG. 1. Proximal probes 502 are juxtaposed, which may mean that they contact each other or that they have spaces between them because they are embedded within, attached to, or otherwise held by a layer, a block, or a substrate of material, which may consist of various types of material; in either case, it may be assumed that the conductive wires in each proximal probe are electrically insulated from the conductive wires in other proximal probes, whether or not the proximal probes contact each other.

Proximal probe array block 504 may be manufactured so that proximal probes 502 and/or the spacing between proximal probes 502 are located as necessary for the geometry of the molecules that are to be manipulated using proximal probe array block 504. In addition, the figures depict the proximal probes as having equal length or height, but the proximal probes in any proximal probe array block may have unequal length or height as appropriate to suit the geometry of a targeted molecule.

The figures also depict the substrate of the proximal probe array block as being planar, but the proximal probe array blocks may have non-planar surfaces such that the proximal probe array blocks have substantially concave, convex, or more complicated shapes. The substrate of the proximal probe array block may also contain structures that may be controlled to increase or decrease the spacing between a subset of proximal probes in the proximal probe array block or to increase or decrease the length or height of a subset of proximal probes from the substrate of the proximal probe array block, as explained and illustrated further below. The substrate of the proximal probe array block is not necessarily made of a single material, and the substrate may comprise different portions that are made of different materials.

With reference now to FIG. 6, a diagram depicts a one-dimensional proximal probe array that is presenting an electrostatic pattern which is facing the electron cloud of a captured molecule within an implementation of the molecular manipulation system of the present invention. As mentioned above, the programmable molecular manipulation system of the present invention employs electrostatic force via proximal probes to achieve the manipulation of molecules. However, before a molecule may be manipulated, the molecule is attracted to the proximal probe array and then captured by the proximal probe array; the basis for the attraction of a molecule to a proximal probe array prior to manipulation of the molecule by the proximal probe array is described with respect to the illustration in FIG. 6.

Proximal probe array block 602 comprises a set of proximal probes. At some point in time, some of the proximal probes are purposefully electrostatically charged, e.g., using the components that are shown in FIG. 1. By applying, asserting, or inducing a voltage to the conductive material on the tip of a proximal probe, e.g., using supporting circuitry 506 that is shown in FIG. 5 and that is ultimately controlled by an apparatus such as computer 108 that is shown in FIG. 1, an electrostatic charge is induced or expressed, i.e. manifested or exposed to external entities. The polarity of the electric potential that is asserted on each proximal probe determines the polarity of the electrostatic charge that is exposed by each proximal probe; some proximal probes remain neutral because no electrical voltage is applied to those proximal probes. Thus, electrostatic pattern 604 is presented by the set of proximal probes when the electrical potentials are applied to the set of proximal probes.

Proximal probe array block 602 is exposed in some manner to one or more targeted molecules. For example, proximal probe array block 602 may be inserted into a reaction container, which may be a simple container that holds a low-temperature, low-pressure gas. Alternatively, the container holds the targeted molecules in liquid form, or the targeted molecules are suspended within a liquid solution, preferably using a solvent that exhibits a lower dipole moment than water; the use of an electrostatic force microscope within a liquid solution is described within Gemma et al., "Apparatus for estimating charged and polarized states of functional groups in a solution", U.S. Pat. No. 5,329,236, issued Jul. 12, 1994, hereby incorporated by reference in its entirety for all purposes. In another alternative, the targeted molecules rest as a film or layer on a substrate, which may be a surface of a container; the use of an interfacial force microscope with respect to films is disclosed in Houston et al., "The Interfacial-Force Microscope," *Nature*, vol. 356, pp. 266–267, May, 19, 1992, hereby incorporated by reference in its entirety for all purposes. Preferably, a substrate that supports a film of targeted molecules would exhibit a relatively small attractive force with respect to the targeted molecules such that the proximal probe array can capture a targeted molecule without employing a significant force for overcoming the attractive force of the substrate.

The use of a proximal probe array may be separated into temporal periods: first, a capturing phase or mode of operation in which a targeted molecule is captured by the proximal probe array; second, a manipulation phase in which a targeted molecule is manipulated by the proximal probe array; and third, a release phase in which a molecule or molecules that are attached to the proximal probe array are released from the proximal probe array.

The goal of the capturing phase is to attract a targeted molecule to the proximal probe array by electrostatic force. In general, assuming that a target molecule has the proper orientation, a targeted molecule within a container would be attracted to the electrostatic pattern that is expressed by a proximal probe array because certain locations of a targeted molecule would have opposite polarity to the electrostatic charge that is expressed by the proximal probe array, as explained hereinbelow; in other words, a targeted molecule would be attracted to the electrostatic pattern of a proximal probe array for the following reasons.

Atoms of different elements have different abilities to attract electrons; when atoms participate in a chemical bond, the atoms exhibit electronegativity, i.e. an attraction for electrons in chemical bond. If the electronegativities of two atoms in a chemical bond are different, an electron will spend more time around the atom that is more electronegative than around the other atom, thereby causing one atom in a chemical bond to appear to acquire a slight negative charge and the other atom to appear to acquire a slight positive charge. This separation of charge constitutes a dipole, and many molecules exhibit many regions or locations around their electron cloud that have different degrees of polarization. A very polar molecule would be strongly attracted to the electrostatic pattern that is presented by an electrostatically charged proximal probe array, while a nonpolar molecule would not be attracted.

Referring again to FIG. 6, a molecule within the reaction container has molecular electron cloud 606, which inherently possesses locations that exhibit polarization such that the molecule presents electrostatic pattern 608. At some point in time, the molecule would be attracted to proximal probe array block 602 such that the respective electrostatic patterns align. A molecule that exhibits a matching pattern of points or locations that have opposite polarity to the pattern of electrostatic charges that are presented by a proximal probe array is said to have a complementary electrostatic pattern to the proximal probe array's electrostatic pattern. The electrostatic pattern that is presented by the proximal probe array at the current point in time is termed the "current electrostatic pattern". A molecule that has a complementary electrostatic pattern to the current electrostatic pattern is termed a "targeted molecule". A targeted molecule is termed a "captured molecule" when the electrostatic pattern of the proximal probe array aligns with the complementary electrostatic pattern of the targeted molecule; a captured molecule may experience an attractive force such that the electrostatic forces between the aligned points may cause the targeted molecule to be held by the proximal probe array for a brief period of time.

A targeted molecule may have numerous polarized locations around its electron cloud. It should be noted that the electrostatic pattern on a proximal probe array may be used such that each proximal probe is intended to be directed at a single, unique, polarized location on a targeted molecule; this is the preferred, default case in which there is a one-to-one relationship between proximal probes and a targeted molecule's polarized locations. However, the electrostatic pattern on a proximal probe array may be used such that a single, unique, proximal probe is intended to be directed at multiple, unique, polarized locations on a targeted molecule, e.g., by using a stronger electric potential on a proximal probe such that it influences multiple polarized locations, because the polarized locations are relatively close compared to the size of the proximal probe. Moreover, the electrostatic pattern on a proximal probe array may be used such that multiple proximal probes are intended to be directed at a single, unique, polarized location on a targeted molecule, e.g., given the geometry of the targeted molecule, the degree of polarity of the polarized location, and the geometry of the proximal probe array. Each of the above-noted cases may be employed simultaneously within a single electrostatic pattern on the proximal probe array.

Given the fact that a targeted molecule may have numerous polarized locations, it should also be noted that the electrostatic pattern on a proximal probe array may target only a subset of the polarized locations on a targeted molecule. In some cases, a subset of the targeted molecule's polarized locations may be deemed sufficient to capture a targeted molecule; in other cases, the geometry of a targeted molecule may prohibit the practical attraction of some of the polarized locations of the targeted molecule. Hereinbelow, each of the polarized locations from the set of polarized locations on a targeted molecule that are designated to be points of attraction by the electrostatic pattern on a proximal probe array are termed "capture points" of the targeted molecule.

With reference now to FIG. 7, a diagram depicts a frontal, edge-on view of a one-dimensional proximal probe array block within an implementation of the molecular manipulation system of the present invention. In this illustration, the tips of the proximal probes in the proximal probe array block are not shown; instead, each proximal probe is represented by the electrostatic charge that is asserted on the respective tip of each proximal probe. In this manner, the proximal probe array is said to present an electrostatic charge pattern, e.g. electrostatic pattern 702, that corresponds to the asserted electric potentials.

With reference now to FIG. 8, a diagram depicts a two-dimensional proximal probe array that can present an electrostatic pattern for attempting to capture a targeted molecule that exhibits an electron cloud that contains polarized locations in accordance with an embodiment of the present invention. FIG. 8 illustrates that molecular electron cloud 802 is a three-dimensional entity that exhibits a three-dimensional arrangement of polarized locations. In contrast to the one-dimensional proximal probe array block in FIG. 6 that has proximal probes that are arranged substantially linearly, two-dimensional proximal probe array block 804 contains proximal probes that are arranged over an area, thereby partially addressing the challenge of capturing a molecule, all of which are three-dimensional entities with complex electron clouds. In a preferred embodiment, the proximal probes are equally spaced over the area with uniformly-sized gaps between the proximal probes, but a proximal probe array block may be manufactured such that the proximal probes are arranged over an area in a variety of locations with varying gap sizes to suit the geometry of a targeted molecule, possibly in addition to a complex shape for the substrate of the proximal probe array block. In the exemplary embodiment of the present invention that is illustrated within FIG. 8, sensors such as sensor probe 806, are interspersed among the proximal probes in proximal probe array block 804; these sensors are described in more detail further below. It should be noted that sensor probes may also be employed within one-dimensional proximal probe array blocks; however, various embodiments of the present invention may or may not comprise sensor probes.

It should also be noted that a proximal probe may act as its own detector; after a targeted molecule is captured, a capture point of the targeted molecule should affect the electrical characteristics of the tip of a proximal probe. By analyzing the electric current through the conducting wire/lead of a given proximal probe or by analyzing the fluctuation of the voltage and/or current that is experienced by the conducting wire/lead, e.g., before, during, and after the capture of a targeted molecule, one may discern whether or not the tip of the proximal probe is in proximity with a captured molecule, or preferably, in proximity with a capture point of a targeted molecule after its capture.

Figure 9:
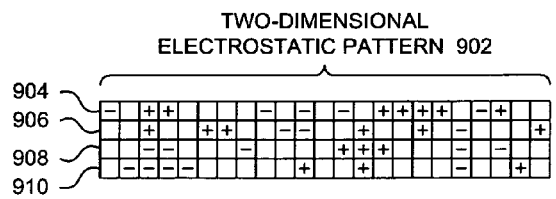
FIG. 9 depicts a diagram that shows a frontal, edge-on view of a two-dimensional proximal probe array block in accordance with an embodiment of the present invention.

With reference now to FIG. 9, a diagram depicts a frontal, edge-on view of a two-dimensional proximal probe array block within an implementation of the molecular manipulation system of the present invention. In a manner similar to that shown in FIG. 7, the tips of the proximal probes in a proximal probe array block are not shown; instead, each proximal probe is represented by the electrostatic charge that is asserted on the respective tip of each proximal probe. In contrast to FIG. 7, which shows a one-dimensional proximal probe array block, FIG. 9 depicts a two-dimensional proximal probe array block that presents electrostatic pattern 902.

In the exemplary embodiment that is shown in FIG. 9, the uniform arrangement of proximal probes within a two-dimensional proximal probe array block is reflected by the uniform arrangement of the electrostatic pattern that is represented within FIG. 9. In the example that is shown in FIG. 9, each row of the two-dimensional proximal probe array may be regarded as a one-dimensional proximal probe array; the two-dimensional proximal probe array in FIG. 9 comprises rows 904, 906, 908, and 910. In this example, a set of one-dimensional proximal probe arrays aligned along a different axis than the axis of the one-dimensional proximal probe arrays comprises a two-dimensional proximal probe array; for example, a two-dimensional proximal probe array may be formed by stacking a set of one-dimensional proximal probe arrays.

However, each of the one-dimensional proximal probe arrays in a two-dimensional proximal probe array does not necessarily share the same geometry; for example, different proximal probe arrays may have different inter-probe gaps or spacings. Moreover, as noted hereinabove, proximal probes may be arranged over an area in a variety of locations with varying gap sizes to suit the geometry of a targeted molecule, and a two-dimensional proximal probe array may have a different geometry. In these alternative embodiments, the non-uniform arrangement of proximal probes within a two-dimensional proximal probe array block might be reflected by a non-uniform arrangement of an electrostatic pattern, which is not shown in FIG. 9.

Figure 10:
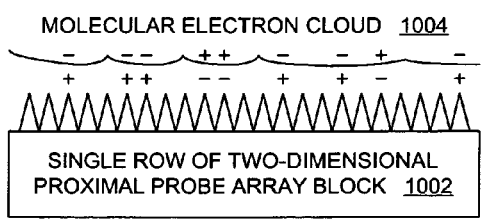
FIG. 10 depicts a diagram that shows a single row of a two-dimensional proximal probe array that is presenting an electrostatic pattern which is facing the electron cloud of a captured molecule in accordance with an embodiment of the present invention.

With reference now to FIG. 10, a diagram depicts a single row of a two-dimensional proximal probe array that is presenting an electrostatic pattern which is facing the electron cloud of a captured molecule within an implementation of the molecular manipulation system of the present invention. FIG. 10 is similar to FIG. 6, but FIG. 10 differs from FIG. 6 in that the depicted one-dimensional proximal probe array block is merely one row of a set of one-dimensional proximal probe array blocks that collectively comprise a two-dimensional proximal probe array block; in other words, FIG. 10 illustrates a horizontal, cut-away slice or view of a single row 1002 of a two-dimensional proximal probe array block, such as that shown in FIG. 8. More specifically, single row 1002 of a two-dimensional proximal probe array corresponds to row 906 that is shown in FIG. 9. Molecular electron cloud 1004 represents a horizontal, cut-away slice or view of a three-dimensional molecular electron cloud, such as molecular electron cloud 806 that is shown in FIG. 8.

Figure 11:
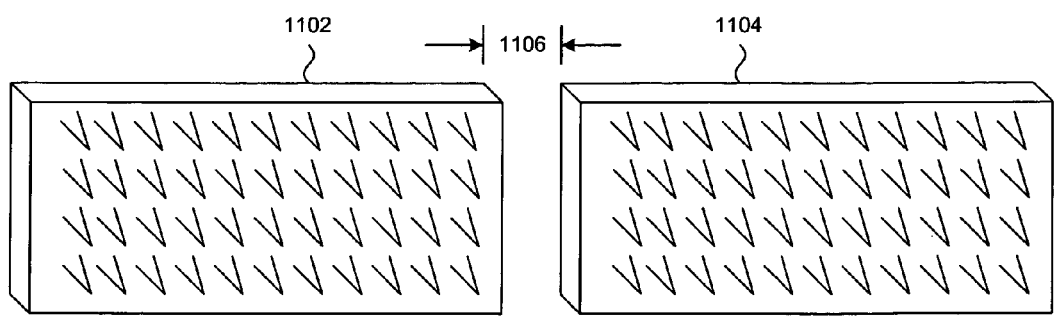
FIG. 11 depicts a diagram that shows a pair of juxtaposed two-dimensional proximal probe array blocks that can be used to capture a targeted molecule in accordance with an embodiment of the present invention.
Figure 12:
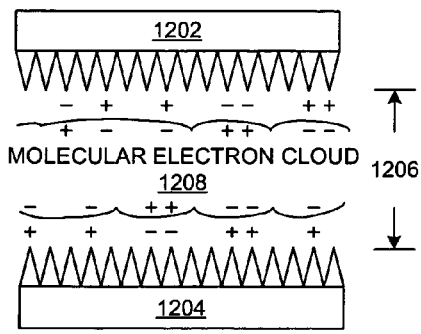
FIG. 12 depicts a diagram that shows a pair of opposing two-dimensional proximal probe array blocks that can be used to capture a targeted molecule in accordance with an embodiment of the present invention.

With reference to FIG. 11, a diagram depicts a pair of juxtaposed two-dimensional proximal probe array blocks that can be used to capture a targeted molecule in accordance with an embodiment of the present invention. The description of FIG. 1 mentions that multiple proximal probe array blocks may be employed within a single programmable molecular manipulation system. FIG. 11 and FIG. 12 depict two different configurations for using multiple proximal probe array blocks; FIG. 11 illustrates juxtaposed proximal probe array blocks, whereas FIG. 12 illustrates opposing or facing proximal probe array blocks. In either case, the molecular manipulation system can be described as having a three-dimensional arrangement of proximal probes; larger, more complex, three-dimensional configurations of proximal probes can be achieved using more numerous proximal probe array blocks. It should also be noted, though, that a molecular manipulation system may comprise one or more individual proximal probes that are configured to be used with at least one proximal probe array block; the individual proximal probes may also be manipulated individually in an opposing or juxtaposed position with respect to a proximal probe array block.

FIG. 11 depicts a pair of juxtaposed two-dimensional proximal probe array blocks 1102 and 1104 that are separated by inter-block gap 1106. The size of inter-block gap 1106 may vary and may be adjustable by an operator, e.g., using the controlling mechanisms that are shown in FIG. 1; in particular, each of proximal probe array blocks 1102 and 1104 may be uniquely associated with an actuator mechanism such that proximal probe array blocks 1102 and 1104 can be moved independently of the other proximal probe array block. A single electrostatic pattern may be shared by each proximal probe array, or two electrostatic patterns may be used such that each proximal probe array may present unique electrostatic patterns. Proximal probe array blocks 1102 and 1104 may be operated to capture a single targeted molecule, to capture two unique targeted molecules, or to capture two identical targeted molecules.

With reference to FIG. 12, a diagram depicts a pair of opposing two-dimensional proximal probe array blocks that can be used to capture a targeted molecule in accordance with an embodiment of the present invention. FIG. 12 depicts one row from each of a pair of opposing two-dimensional proximal probe array blocks 1202 and 1204 that are separated by inter-block gap 1206; it may be assumed that FIG. 12 illustrates a top view or a horizontal, cut-away view or slice of two complete, two-dimensional, proximal probe array blocks in the manner that is shown in FIG. 10. The size of inter-block gap 1206 may vary and may be adjustable by an operator, e.g., using the controlling mechanisms that are shown in FIG. 1; in particular, each of proximal probe array blocks 1202 and 1204 may be uniquely associated with an actuator mechanism such that proximal probe array blocks 1202 and 1204 can be moved independent of the other proximal probe array block. A single electrostatic pattern may be shared by each proximal probe array, or two electrostatic patterns may be used such that each proximal probe array may present unique electrostatic patterns. Proximal probe array blocks 1202 and 1204 may be operated to capture a single targeted molecule, to capture two unique targeted molecules, or to capture two identical targeted molecules. In the example that is shown in FIG. 12, a single captured molecule is represented by a top view or a horizontal, cut-away view or slice of molecular electron cloud 1208.

Figure 13:
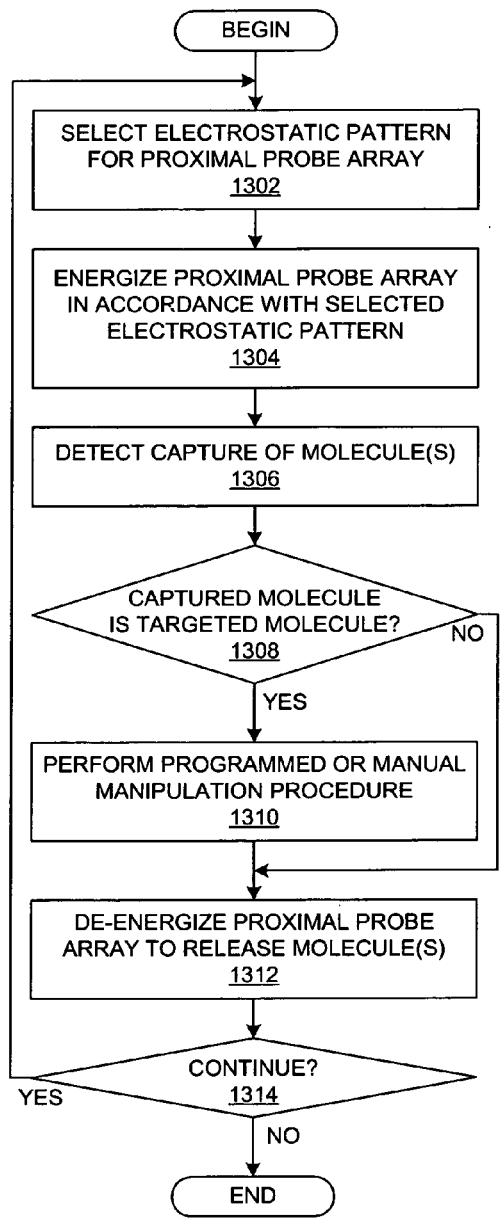
FIG. 13 depicts a flowchart that shows a process for using proximal probe arrays to manipulate molecules in accordance with an embodiment of the present invention.

With reference now to FIG. 13, a flowchart depicts a process for using proximal probe arrays to manipulate molecules in accordance with an embodiment of the present invention. The description of the previous figures merely mentioned that molecules may be manipulated, but the focus of the majority of the description of the figures has been directed to explaining the manner in which a proximal probe array may be used to capture a targeted molecule or molecules. The process that is illustrated within FIG. 13 provides a foundation for describing the different types of molecular manipulation that may be performed, which are described in more detail hereinbelow.

The process commences with the selection of an electrostatic pattern for one or more proximal probe arrays (step 1302). The selection may be performed in accordance with input from a user of the molecular manipulation system, or the selection may be automatically and programmatically performed, preferably in accordance with configuration parameters that guide the operation of the manipulation procedure, wherein one or more of the configuration parameters may have been selected by a user.

The proximal probe array is then energized in accordance with the selected electrostatic pattern (step 1304) by asserting or not asserting an electrical potential on each proximal probe in the proximal probe array as is indicated by a position in the electrostatic pattern that corresponds to each proximal probe. The electrostatic patterns may be hardwired in the molecular manipulation system, or the electrostatic patterns may be managed in software by storing the electrostatic patterns as data in one or more data structures or memories. For example, a database of electrostatic patterns may be accessible to computer 108 that is shown in FIG. 1.

In a simple case, each proximal probe may be represented by a data flag within a data structure that represents the electrostatic pattern; the position of a data flag within the data structure corresponds to the position of a proximal probe in a proximal probe array in a one-to-one relationship. The data flags may be implemented using two binary bits that allow four values: a first value represents that a positive electric potential should be applied to the corresponding proximal probe; a second value represents that a negative electric potential should be applied to the corresponding proximal probe; a third value represents that the corresponding proximal probe should have no electrical potential, i.e. tied to ground; and a fourth value might represent a don't-care value in which the electrical potential that is applied to the proximal probe may have either a positive or a negative electric potential. The data flags would be mapped when necessary to voltages that are to be applied to corresponding proximal probes, e.g., using electrostatic controller 114 that is shown in FIG. 1.

Alternatively, each proximal probe may be represented by a record within one or more database files that are stored within one or more memories. Each database file may represent an electrostatic pattern, wherein each record contains multiple fields for various parameters that are used to individually control a variety of physical characteristics or physical variables that are associated with each proximal probe. For example, it may be advantageous to apply different voltages on different proximal probes in accordance with different capture points that are targeted by different proximal probes, and the values for the voltages would be stored as merely one of the parameters within the corresponding record. The position of a record within this type of database file may correspond with the position of a proximal probe in a proximal probe array in a one-to-one relationship; alternatively, the record may contain identifying coordinates for indicating the relative position of the proximal probe to which the record corresponds. The records would be mapped when necessary to voltages and/or other types of physical variables that are to be applied to corresponding proximal probes, e.g., via electrostatic controller 114 that is shown in FIG. 1.

After energizing the proximal probe array, the proximal probe array block is presented to targeted molecules within a reaction container: a volume of low-temperature, low-pressure gas that contains the targeted molecules in a gaseous state; a volume of liquid in a reaction chamber or container that contains the targeted molecules in a liquid state; or a film or layer that contains the targeted molecules, wherein the film or layer has been deposited on a surface or substrate. A set of one or more proximal probes would present an electrostatic charge pattern to the targeted molecules, and the electrostatic charge would attract polarized locations or capture points on the targeted molecules.

At some point in time, a molecule would be captured by the proximal probe array (step 1306), and an optional check may be made to ensure that the captured molecule is the targeted molecule that the operator desired to manipulate (step 1308). The capture of a molecule may be optionally detected using sensing detectors that are incorporated into the proximal probe array and/or are connected to the proximal probe array; in addition, the captured molecule may be optionally verified as being an instance of the targeted molecule rather than a random molecule that happens to be captured by the proximal probe array. Referring again to FIG. 8, proximal probe array block 802 depicts sensors interspersed amongst the proximal probes. A sensor does not necessarily have the same form or structure as a proximal probe, and a variety of sensor types may be incorporated into the proximal probe array block; for example, U.S. Pat. No. 6,507,197, incorporated above, discloses the use of electrostatic force detectors in conjunction with an electrostatic force microscope. Other techniques may be used to detect the capture of a targeted molecule, such as using spectrographic techniques on the reflected light from a laser beam that is aimed at the captured molecule. In addition, as noted above, a proximal probe may act as its own detector.

Referring again to FIG. 13, if a targeted molecule has been captured, then a programmed procedure or manual operation is performed to manipulate the captured molecule (step 1310), possibly using multiple proximal probe array blocks and/or multiple captured molecules. After the manipulation is performed, or if the captured molecule was not the targeted molecule at step 1308, then the proximal probe array block is de-energized to release the captured molecule or molecules (step 1312), e.g., by canceling the applied voltages to the proximal probes that were previously charged/energized; the manipulated molecule may optionally be held by the proximal probe array block by omitting step 1312 if a subsequent molecular manipulation is desired, as explained in more detail further below. A determination is made as to whether or not another manipulation procedure is to be performed (step 1314), and if so, then the process branches back to step 1302 to capture and manipulate another molecule; if not, then the process is concluded.

Figure 14:
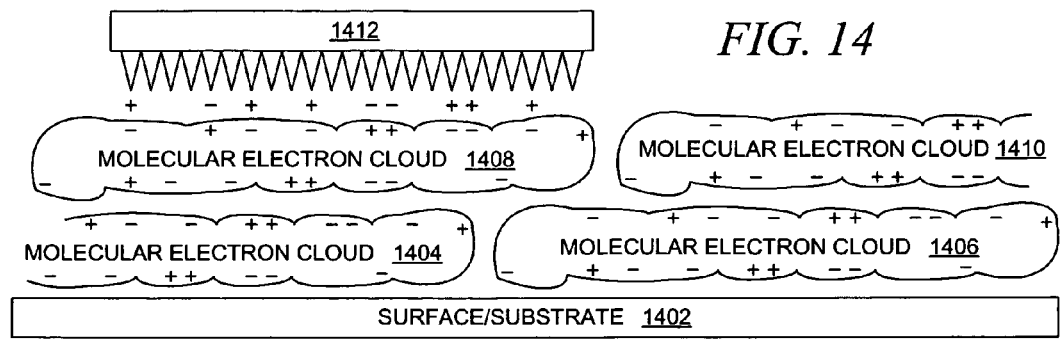
FIG. 14 depicts a diagram that shows a proximal probe array block that is attempting to capture and hold one of a set of targeted molecules that are deposited as a film on a surface.

With reference now to FIG. 14, a diagram depicts a proximal probe array block that is attempting to capture and hold one of a set of targeted molecules that are deposited as a film on a surface. Surface/substrate 1402 supports a film of targeted molecules that are represented by their molecular electron clouds 1404–1410. Proximal probe array block 1412 is moved into a position over the film of targeted molecules to try to capture the targeted molecule that is represented by molecular electron cloud 1408. When the gap between proximal probe array block 1412 and the targeted molecule is below a certain value, the targeted molecule would be attracted to the proximal probe array block by an electrostatic force that is greater than the attractive forces between the targeted molecule and other molecules within the film and that is greater than the force of gravity that acts to pull the targeted molecule toward the surface below it. The targeted molecule could then be described as being captured by the proximal probe array block, which would hold the captured molecule until it is released by the proximal probe array or until the captured molecule has experienced an event that might cause the release of the captured molecule, such as a collision with a relatively high-energy molecule in a gaseous state that acts to knock the captured molecule from the proximal probe array.

The previously described figures illustrate various examples of structures that may be used to capture and manipulate a molecule in accordance with an embodiment of the present invention. FIG. 13 illustrates a process for using those structures to manipulate a molecule; step 1310 is directed to the process step by which a programmed procedure or manual operation is performed to manipulate the captured molecule. However, the previously described figures have not illustrated the details of the various ways that a molecule may be manipulated in accordance with the molecular manipulation system of the present invention, which is described in more detail hereinbelow with respect to the remaining figures. It should be noted that the term "manipulation" may refer to many different types of actions that include, but is not limited to, stretching, stressing, shearing, modifying, bending, twisting, combining, binding, fusing, uniting, ripping, breaking, rendering, or any other actions that are related to physical transformation, possibly on one molecule but possibly on two or more molecules.

Figure 15A:
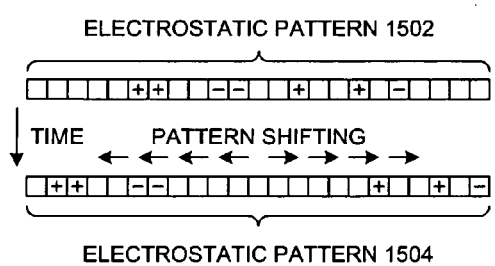
FIGS. 15A–15C depict a set of diagrams that show a method of using a proximal probe array to shift an electrostatic pattern over a short period of time in accordance with an embodiment of the present invention.
Figure 15B:
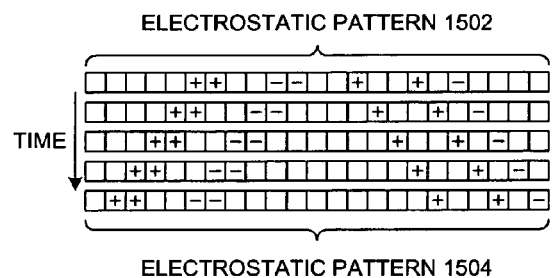
Figure 15C:
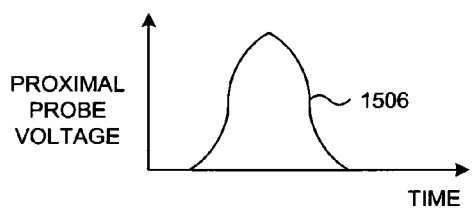

With reference now to FIGS. 15A–15C, a set of diagrams depict a method of using a proximal probe array to shift an electrostatic pattern over a short period of time in accordance with an embodiment of the present invention. As discussed above, a captured molecule on a proximal probe array is held in place by maintaining the electrostatic forces that are generated by an electrostatic pattern on the proximal probe array. As one of the techniques for manipulating a captured molecule using a proximal probe array, those same electrostatic forces that are used to hold a captured molecule are also used to move the captured molecule by modifying the electrostatic pattern.

Electrostatic pattern 1502 is similar to electrostatic pattern 702 that is shown in FIG. 7. Over a relatively short period of time, electrostatic pattern 1502 can be modified to electrostatic pattern 1504; the duration of the modification time period may be a configurable parameter, e.g., via a software application that is executing on computer 108 as shown in FIG. 1.

The modification of the electrostatic pattern may occur in a variety of ways; it should be not assumed that the examples that are provided herein comprise an exhaustive list. In one exemplary embodiment, the electrostatic pattern is shifted during the modification time period in a manner similar to a bit shift in a computer memory, wherein the complete shift operation occurs over a series of shorter time periods using a series of smaller shift operations, preferably individual bit shifts, as shown in FIG. 15B. During one of the shorter time periods, each proximal probe in a first subset of the proximal probes, which may or may not be in an energized state, i.e. may or may not be exhibiting an electrostatic charge, accepts the state of the adjacent proximal probe; meanwhile, a second subset of proximal probes, which may or may not be in an energized state, accept the state of the adjacent proximal probe. The shorter shift operation is then repeated as many times as necessary to complete the overall shift operation that results in the modification of the electrostatic pattern.

Another way to modify the electrostatic pattern is similar to the series of smaller, adjacent shifts as described above, but in this alternative example, the smaller shift operations are regarded as being more like analog operations rather than like discrete, digital operations. In this second example, the states of the proximal probes are changed spatially in a manner similar to that described above; the states of a first set of proximal probes are modified while also modifying the states of a second set of proximal probes, wherein each of proximal probes in the second set of proximal probes is adjacent to a proximal probe in the first set of proximal probes. Alternatively, the states of the proximal probes are not necessarily adjacent but are relatively close, wherein the distance is also configurable.

Figure 15D:
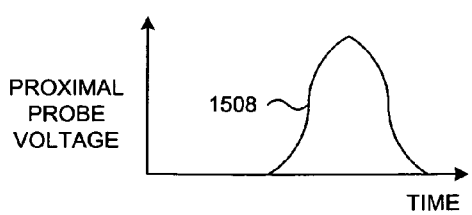

However, in this second example, the states of the proximal probes are shifted temporally in a different manner. In this second example, the states of the proximal probes are shifted gradually in accordance with a function rather than abruptly in a discrete manner, e.g., as illustrated by function 1506 in FIG. 15C; the function may be a configurable parameter that is selected manually by an operator or programmatically by the molecular manipulation system, and the parameters for the function may also be configurable. Hence, during one of the smaller time periods, the electric potentials on some of the proximal probes are gradually decreased while the electric potentials on other proximal probes are gradually increased. For example, function 1506 in FIG. 15C may represent the voltage on a first proximal probe, and function 1508 in FIG. 15D may represent the voltage on a second proximal probe that is adjacent to the first proximal probe. FIG. 15C and FIG. 15D represent the same time period; as the voltage is being decreased on the first proximal probe, the voltage is being increased on the second proximal probe. The shorter shift operation is then repeated as many times as necessary to complete the overall shift operation that results in the modification of the electrostatic pattern.

As noted above, there are different types of manipulation. These different types of manipulation can be achieved by modifying the electrostatic pattern in different ways.

Figure 16A:
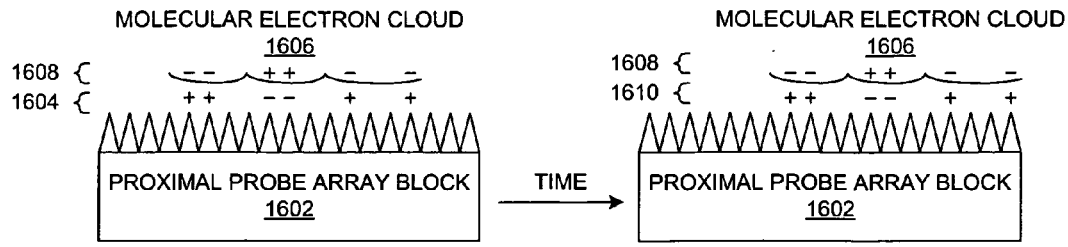
FIG. 16A depicts a diagram that shows a method for using a proximal probe array block to move a targeted molecule in accordance with an embodiment of the present invention.

With reference now to FIG. 16A, a diagram depicts a method for using a proximal probe array block to move a targeted molecule in accordance with an embodiment of the present invention. FIG. 16A depicts an example in which an entire electrostatic pattern on a proximal probe array block may be shifted, e.g., using the examples that are discussed above with respect to FIGS. 15A–15C, in order to accomplish a move operation as one of the types of manipulation of a molecule. When an entire electrostatic pattern is shifted, the entire pattern of electrostatic forces are also shifted. Given that the captured molecule has polarized locations, i.e. capture points, that are attracted by the proximal probes that are exerting an electrostatic force, the capture points remain attracted to those proximal probes during the shifting operation, and the capture points also move during the shifting operation. Hence, the captured molecule may be moved as a whole around the proximal probe array by shifting the electrostatic pattern.

In a manner similar to that shown in FIG. 6, proximal probe array block 1602 comprises a set of proximal probes, which have been energized with an electric potential so that the proximal probes exhibit electrostatic pattern 1604. A captured molecule has molecular electron cloud 1606, which possesses inherent capture points that exhibit polarization such that the molecule presents electrostatic pattern 1608. At some point in time, the molecule would be attracted to proximal probe array block 1602 such that the respective electrostatic patterns align, and the molecule would be captured by proximal probe array block 1602, e.g., as described with respect to FIG. 14.

At some subsequent point in time, portions of the electrostatic pattern on proximal probe array block 1602 are shifted to create electrostatic pattern 1610. Capture points that are represented by electrostatic pattern 1608 in molecular electron cloud 1606 follow electrostatic pattern 1610 such that the captured molecule is also shifted when the electrostatic pattern on proximal probe array block is shifted.

Figure 16B:
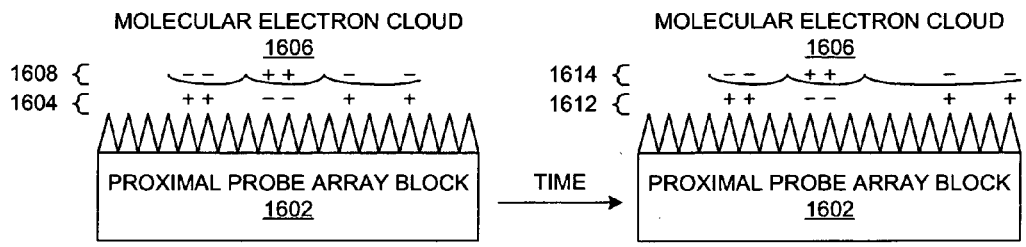
FIG. 16B depicts a diagram that shows a method for using a proximal probe array block to bend or flex a targeted molecule in accordance with an embodiment of the present invention.

With reference now to FIG. 16B, a diagram depicts a method for using a proximal probe array block to bend or flex a targeted molecule in accordance with an embodiment of the present invention. FIG. 16B depicts an example in which a portion of an electrostatic pattern on a proximal probe array block may be shifted in order to accomplish a bending or flex operation as one of the types of manipulation of a molecule. When only a portion of the whole electrostatic pattern is shifted, then only a portion of the electrostatic forces are also shifted. The capture points of the captured molecule remain attracted to their respective proximal probes during the shifting operation; a portion of the capture points move during the shifting operation while the remainder of the capture points remain attracted to a fixed location. Hence, the captured molecule bends or flexes with the partial shifting of the electrostatic pattern.

FIG. 16B is similar to FIG. 16A; identical reference numerals refer to identical elements. Proximal probe array block 1602 exhibits electrostatic pattern 1604, which has captured a molecule that has molecular electron cloud 1606 that contains the capture points that are represented by electrostatic pattern 1608.

At some subsequent point in time, portions of the electrostatic pattern on proximal probe array block 1602 are shifted to create electrostatic pattern 1612. Capture points that are represented by electrostatic pattern 1614 in molecular electron cloud 1606 follow electrostatic pattern 1612 such that the captured molecule is stretched or elongated when the electrostatic pattern on proximal probe array block is shifted. The degree to which a captured molecule may be bent or flexed would depend somewhat on the type of molecule.

Figure 16C:
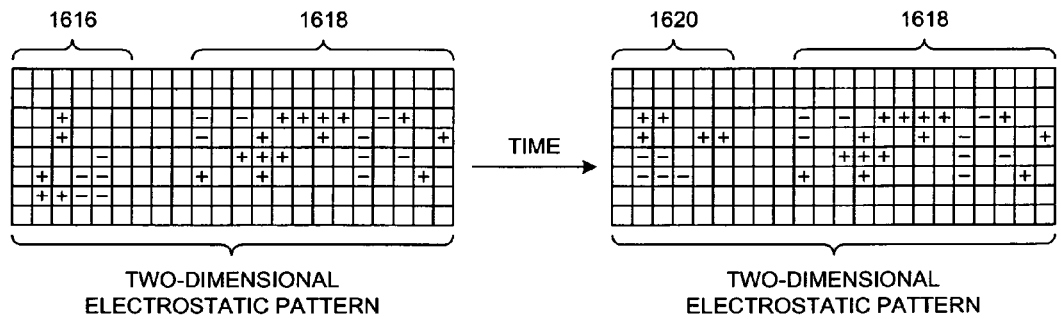
FIG. 16C depicts a diagram that shows a method for using a proximal probe array block to twist or pivot a portion of a targeted molecule in accordance with an embodiment of the present invention.

With reference now to FIG. 16C, a diagram depicts a method for using a proximal probe array block to twist or pivot a portion of a targeted molecule in accordance with an embodiment of the present invention. FIG. 16C depicts an example in which a portion of an electrostatic pattern on a proximal probe array block is shifted and pivoted around a point in order to accomplish a twisting or torque operation as one of the types of manipulation. When only a portion of the whole electrostatic pattern is shifted, then only a portion of the electrostatic forces are also shifted, and the captured molecule bends or flexes with the partial shifting of the electrostatic pattern, as described above. However, instead of shifting the electrostatic pattern in a simple linear fashion, the electrostatic pattern may be rotated about an axis. Again, the capture points of the captured molecule remain attracted to their respective proximal probes during the shifting operation, and a portion of the capture points rotate during the shifting operation while the remainder of the capture points remain attracted to a fixed location. Hence, the captured molecule twists with the partial shifting of the electrostatic pattern.

FIG. 16C is similar to FIG. 9; each depicts a two-dimensional electrostatic pattern on a proximal probe array block. The electrostatic pattern in FIG. 16C consists of portion 1616 and portion 1618. At some subsequent point in time, portion 1616 of the electrostatic pattern is rotated ninety degrees clockwise to form portion 1620 of the electrostatic pattern while portion 1618 remains unmodified. Assuming that the electrostatic pattern had previously captured a molecule, a subset of the capture points on the captured molecule would follow electrostatic pattern 1616 as it is shifted such that a portion of the captured molecule is twisted when the electrostatic pattern on proximal probe array block is shifted.

Alternatively, the electrostatic pattern may have previously captured two molecules: a first molecule may be held by portion 1616 of the electrostatic pattern while a second molecule may be held by portion 1618 of the electrostatic pattern. At some subsequent point in time, shifting portion 1616 of the electrostatic pattern to form portion 1620 of the electrostatic pattern would rotate the first molecule; since portion 1618 remains unshifted, the second molecule would remain unmoved.

Figure 16D:
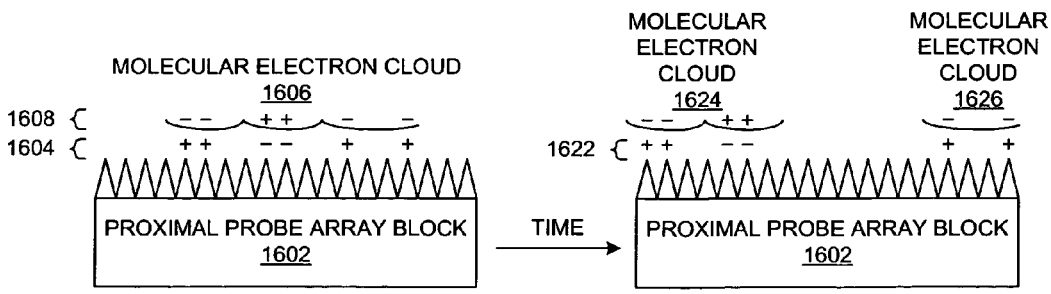
FIG. 16D depicts a diagram that shows a method for using a proximal probe array block to break a targeted molecule in accordance with an embodiment of the present invention.

With reference now to FIG. 16D, a diagram depicts a method for using a proximal probe array block to break a targeted molecule in accordance with an embodiment of the present invention. FIG. 16D depicts an example in which a first portion of the electrostatic pattern may be shifted while a second portion of the electrostatic pattern is shifted in an opposite or different direction; this operation is similar to the operation that is illustrated in FIG. 15A or FIG. 15B. Again, the capture points of the captured molecule remain attracted to their respective proximal probes during the shifting operation. A first subset of the capture points are shifted along with the first portion of the electrostatic pattern while a second subset of the proximal probes are shifted along with the second portion of the electrostatic pattern. Hence, the captured molecule bends or flexes with the shifting portions of the electrostatic pattern, and if the stress on a chemical bond between atoms within the molecule is large enough, the chemical bond will break.

FIG. 16D is similar to FIG. 16A; identical reference numerals refer to identical elements. Proximal probe array block 1602 comprises a set of proximal probes, which have been energized with an electric potential so that the proximal probes exhibit electrostatic pattern 1604. A captured molecule has molecular electron cloud 1606, which possesses inherent capture points that exhibit polarization such that the molecule presents electrostatic pattern 1608. At some point in time, the molecule would be attracted to proximal probe array block 1602 such that the respective electrostatic patterns align, and the molecule would be captured by proximal probe array block 1602.

At some subsequent point in time, portions of the electrostatic pattern on proximal probe array block 1602 are shifted to create electrostatic pattern 1622, and the captured molecule bends or flexes with the shifting portions of the electrostatic pattern. If the stress on a chemical bond between atoms within the molecule is large enough, then the chemical bond will break, thereby splitting or breaking the captured molecule into two different molecules, which are represented by molecular electron cloud 1624 and molecular electron cloud 1626. The proximal probe array can then be de-energized by terminating the voltages on the appropriate proximal probes, and the captured molecules would be released.

It should be noted that the polarization locations on the split molecules may differ from the polarization locations on the original molecule because the split molecules may have very different structures from the constituent pieces of the original molecule, thereby generating different dipole moments. Thus, it is possible that electrostatic pattern 1622 would repel molecular electron cloud 1624 and molecular electron cloud 1626 immediately after the split operation.

The manner in which electrostatic pattern 1604 is divided into separate portions for the shifting operation can be controlled as a configuration parameter, thereby allowing the molecular manipulation system to target a specific chemical bond within the captured molecule. Given that the stress on a chemical bond increases as the captured molecule is bent or flexed over a greater distance, it should be noted that a similar result might be obtained by shifting only one portion of the electrostatic pattern albeit a greater distance.

Figure 17:
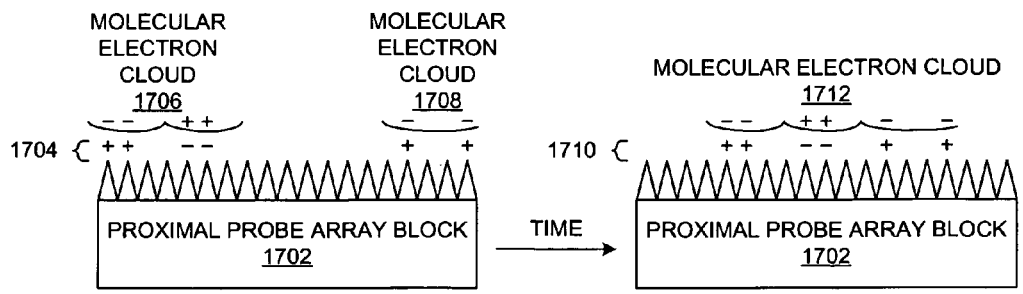
FIG. 17 depicts a diagram that shows a method for using a proximal probe array to create a molecule by combining two targeted molecules in accordance with an embodiment of the present invention.

With reference now to FIG. 17, a diagram depicts a method for using a proximal probe array to create a molecule by combining two targeted molecules in accordance with an embodiment of the present invention. Whereas FIG. 16D illustrates a splitting operation, FIG. 17 illustrates a combining operation; thus, FIG. 17 is similar to FIG. 16D except that the temporal aspects are reversed.

Proximal probe array block 1702 comprises a set of proximal probes, which have been energized with an electric potential so that the proximal probes exhibit electrostatic pattern 1704. Two unique, captured molecules are represented by molecular electron cloud 1706 and molecular electron cloud 1708. The captured molecules may be different; however, the captured molecules may be identical because, even though molecular electron cloud 1706 and molecular electron cloud 1708 are illustrated differently, the entire electron cloud might not be illustrated.

At some subsequent point in time, portions of the electrostatic pattern on proximal probe array block 1704 are shifted to create electrostatic pattern 1710, and the captured molecules are brought into close proximity when the captured molecules move with the shifted portions of the electrostatic pattern. Assuming that the captured molecules have some degree of chemical affinity for each other, a chemical bond is made between the captured molecules such that they form a single captured molecule, which is represented by molecular electron cloud 1712. The proximal probe array can then be de-energized by terminating the voltages on the appropriate proximal probes, and the captured molecule would be released.

It should be noted that the polarization locations on the created molecule may differ from the polarization locations on the original molecules because the created molecule may have a completely different structure than the constituent structures of the original molecules, thereby generating completely different dipole moments in the created molecule. Thus, it is possible that electrostatic pattern 1710 would repel molecular electron cloud 1712 immediately after the combination operation.

Figure 18:
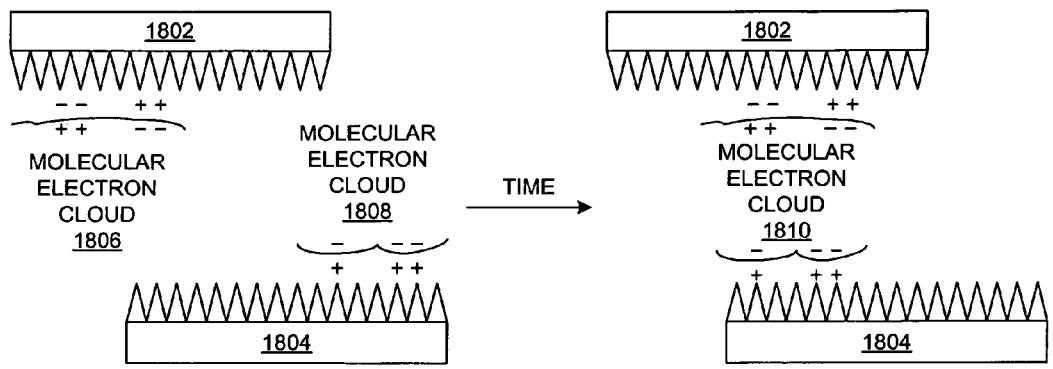
FIG. 18 depicts a diagram that shows a method for using multiple proximal probe arrays to create a molecule by combining two targeted molecules in accordance with an embodiment of the present invention.

With reference now to FIG. 18, a diagram depicts a method for using multiple proximal probe arrays to create a molecule by combining two targeted molecules in accordance with an embodiment of the present invention. Whereas FIG. 17 illustrates a combining operation using one proximal probe array block, FIG. 18 illustrates a combining operation using two proximal probe array blocks. Proximal probe array blocks 1802 and 1804 have been energized with an electrostatic pattern. Two unique, captured molecules are represented by molecular electron cloud 1806 and molecular electron cloud 1808.

At some subsequent point in time, portions of the electrostatic pattern on proximal probe array block 1804 are modified to create a new electrostatic pattern, e.g., by shifting the original electrostatic pattern, and the captured molecules are brought into close proximity when captured molecule 1808 moves with the shifted portion of the electrostatic pattern. Assuming that the captured molecules have some degree of chemical affinity for each other, a chemical bond is made between the captured molecules such that they form a single captured molecule, which is represented by molecular electron cloud 1810. The proximal probe array can then be de-energized by terminating the voltages on the appropriate proximal probes, and the captured molecule would be released.

The molecular manipulation operations that are described with respect to FIGS. 15–18 are achieved solely through electrical means; more specifically, the molecular manipulation operations are accomplished only through modification of the electrostatic pattern on a proximal probe array. However, other molecular manipulation operations can be achieved through mechanical means; more specifically, other molecular manipulation operations can be accomplished by movement of tips of proximal probes and/or by movement of proximal probe array blocks, as described in more detail further below with respect to the remaining figures.

Figure 19:
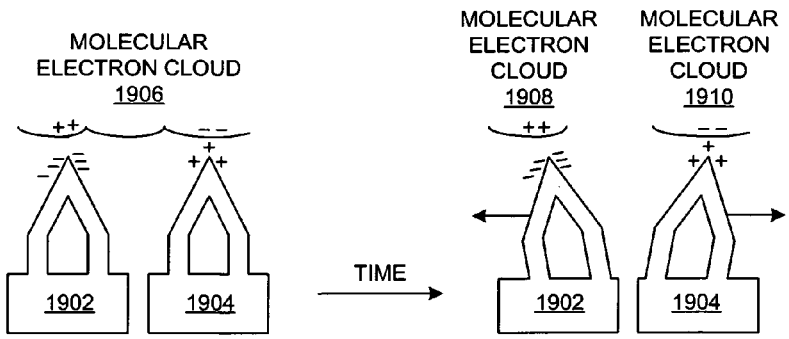
FIG. 19 depicts a diagram that shows a pair of cantilevered tips at the ends of proximal probes on a proximal probe array in which the tips are flexed to split a captured molecule in accordance with an embodiment of the present invention.

With reference now to FIG. 19, a diagram depicts a pair of cantilevered tips at the ends of proximal probes on a proximal probe array in which the tips are flexed to split a captured molecule in accordance with an embodiment of the present invention. Tip 1902 is the end portion of a proximal probe that is assembled with other proximal probes in a proximal probe array; tip 1904 is the end portion of an adjacent proximal probe. The proximal probe array block has already captured a molecule, which is represented by molecular electron cloud 1906. Tips 1902 and 1904 are exerting an electrostatic force on the capture points of the captured molecule.

At a subsequent point in time, the cantilever portions of tips 1902 and 1904 are controlled through electronic circuitry to flex in lateral but opposite directions. The capture points of the captured molecule remain attracted to their respective tips during the flexing operation, and the captured molecule bends or flexes with the flexing tips. If the stress on a chemical bond between atoms within the molecule is large enough, the chemical bond will break, which results in the formation of two molecules from the captured molecule, which are represented by molecular electron clouds 1908 and 1910. The tips can then be de-energized by terminating the voltages on the appropriate proximal probes, and the captured molecules would be released. In this manner, a variety of molecular manipulation operations, such as the splitting operation that is shown in FIG. 19, can be accomplished by movement of the cantilevered tips of a set of proximal probes; the number of proximal probes that may be used in this manner may vary with the geometry of the captured molecule.

Figure 20:
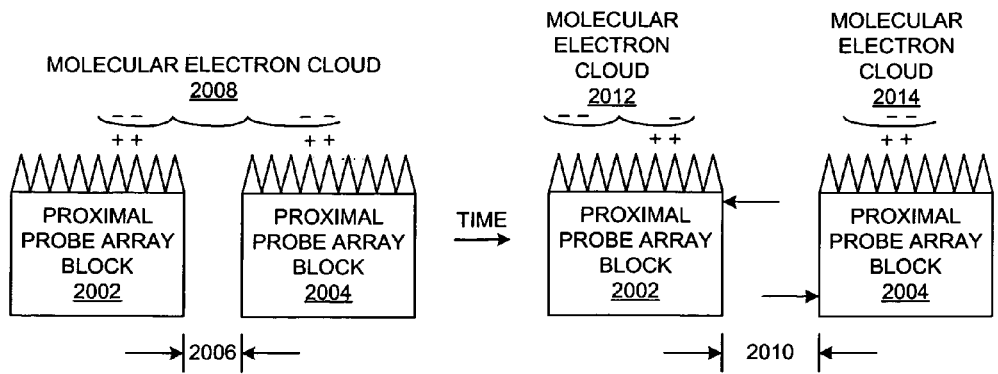
FIG. 20 depicts a diagram that shows a pair of juxtaposed proximal probe array blocks in which the proximal probe array blocks are moved to split a captured molecule in accordance with an embodiment of the present invention.

With reference now to FIG. 20, a diagram depicts a pair of juxtaposed proximal probe array blocks in which the proximal probe array blocks are moved to split a captured molecule in accordance with an embodiment of the present invention. As noted above, multiple proximal probe array blocks may be used to manipulate one or more molecules simultaneously. Proximal probe array blocks 2002 and 2004 are separated by inter-block gap 2006 in a manner similar to that shown in FIG. 11. Proximal probe array blocks 2002 and 2004 have already captured a single molecule, which is represented by molecular electron cloud 2008.

At a subsequent point in time, proximal probe array blocks 2002 and 2004 are controlled through electronic circuitry to move in lateral but opposite directions, which enlarges the inter-block gap between proximal probe array blocks 2002 and 2004, which is shown as inter-block gap 2010; alternatively, the proximal probe array blocks could be translated and rotated in a variety of orientations. The capture points of the captured molecule remain attracted to their attracting proximal probes during the moving operation, and the captured molecule stretches with the moving proximal probes. If the stress on a chemical bond between atoms within the molecule is large enough, the chemical bond will break, which results in the formation of two molecules from the captured molecule, which are represented by molecular electron clouds 2012 and 2014. The proximal probes can then be de-energized by terminating the voltages on the appropriate proximal probes, and the captured molecules would be released. In this manner, a molecular manipulation operation, e.g., splitting, can be accomplished by movement of a set of proximal probe array blocks; the number of proximal probe array blocks that may be used in this manner may vary with the geometry of the captured molecule.

Figure 21:
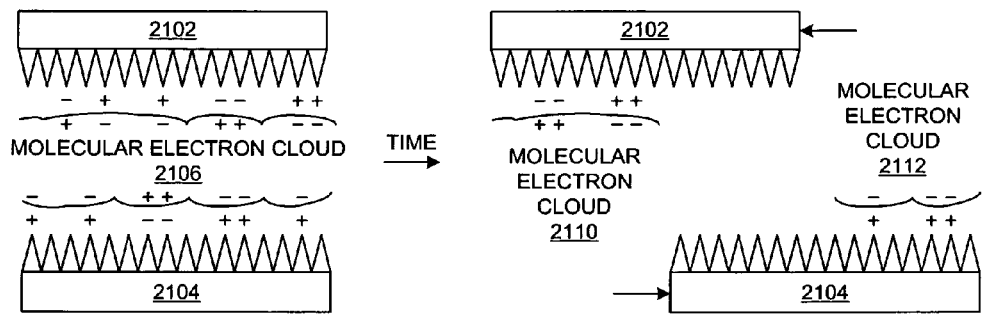
FIG. 21 depicts a diagram that shows a pair of opposing proximal probe array blocks in which the proximal probe array blocks are moved to split a captured molecule in accordance with an embodiment of the present invention.

With reference now to FIG. 21, a diagram depicts a pair of opposing proximal probe array blocks in which the proximal probe array blocks are moved to split a captured molecule in accordance with an embodiment of the present invention. In a manner similar to that shown in FIG. 20, a pair of proximal probe array blocks are holding a single captured molecule. Proximal probe array blocks 2102 and 2104 are separated by an inter-block gap in a manner similar to that shown in FIG. 12. Proximal probe array blocks 2102 and 2104 have already captured a single molecule, which is represented by molecular electron cloud 2106. Whereas FIG. 20 depicts a molecular manipulation operation that can be described as tearing the captured molecule, FIG. 21 depicts a molecular manipulation operation that can be described more like a shearing operation on the captured molecule.

At a subsequent point in time, proximal probe array blocks 2102 and 2104 are controlled through electronic circuitry to move in lateral but opposite directions; alternatively, the proximal probe array blocks could be translated and rotated in a variety of orientations. The capture points of the captured molecule remain attracted to their attracting proximal probes during the moving operation, and the captured molecule stretches with the moving proximal probes. If the stress on a chemical bond between atoms within the molecule is large enough, the chemical bond will break, which results in the formation of two molecules from the captured molecule, which are represented by molecular electron clouds 2110 and 2112. The proximal probes can then be de-energized by terminating the voltages on the appropriate proximal probes, and the captured molecules would be released. In this manner, a molecular manipulation operation, e.g., shearing, can be accomplished by movement of a set of proximal probe array blocks; the number of proximal probe array blocks that may be used in this manner may vary with the geometry of the captured molecule.

Figure 22:
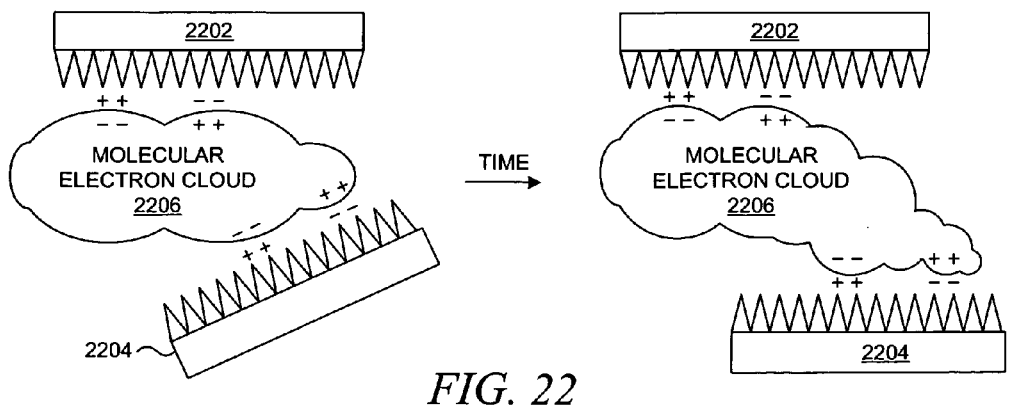
FIG. 22 depicts a diagram that shows a pair of opposing proximal probe array blocks in which one of the proximal probe array blocks is moved to flex a captured molecule in accordance with an embodiment of the present invention.

With reference now to FIG. 22, a diagram depicts a pair of opposing proximal probe array blocks in which one of the proximal probe array blocks is moved to flex a captured molecule in accordance with an embodiment of the present invention. In a manner similar to that shown in FIG. 21, a pair of proximal probe array blocks are holding a single captured molecule. Proximal probe array blocks 2202 and 2204 are separated by an inter-block gap in a manner similar to that shown in FIG. 12. Proximal probe array blocks 2202 and 2204 have already captured a single molecule, which is represented by molecular electron cloud 2206.

At a subsequent point in time, proximal probe array block 2204 is controlled through electronic circuitry to be translated and rotated. The capture points of the captured molecule remain attracted to their attracting proximal probes during the manipulation operation, and the captured molecule stretches with the moving proximal probes, thereby imparting a different shape to the captured molecule.

Before the proximal probes are de-energized, various other operations may be performed. For example, another proximal probe array block holding a different captured molecule may be brought into close proximity with molecular electron cloud 2206 in its flexed shape, thereby allowing a chemical reaction to occur between the two captured molecules that would not otherwise occur if the molecules were in close proximity but retained their normal shapes.

While the captured molecule has its flexed shape, another operation that might be performed would be to quickly release the captured molecule from the proximal probe arrays. Given the flexed shape at its release, the captured molecule may change its structure such that its resting shape is different from the resting shape that it possessed when it was previously captured. The properties of the newly formed molecule could then be studied. For example, a protein molecule may fold into a different shape after its release, and the properties of the newly generated protein could be studied.

Figure 23:
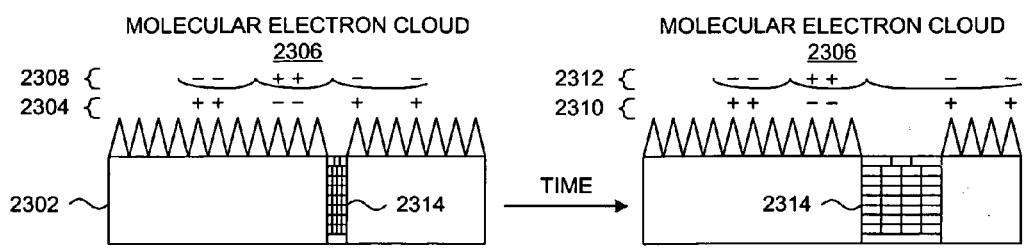
FIG. 23 depicts a diagram that shows a method for using a proximal probe array block to manipulate a targeted molecule in which the proximal probe array block has a self-contained modification mechanism in accordance with an embodiment of the present invention.

With reference now to FIG. 23, a diagram depicts a method for using a proximal probe array block to manipulate a targeted molecule in which the proximal probe array block has a self-contained modification element in accordance with an embodiment of the present invention. FIG. 23 is similar to FIG. 16B in the following manner. Proximal probe array block 2302 exhibits electrostatic pattern 2304, which has captured a molecule that has molecular electron cloud 2306 that contains the capture points that are represented by electrostatic pattern 2308. At some subsequent point in time, the electrostatic pattern on proximal probe array block 2302 is modified to create electrostatic pattern 2310. Capture points that are represented by electrostatic pattern 2312 in molecular electron cloud 2306 follow electrostatic pattern 2310 such that the captured molecule is stretched or elongated when the electrostatic pattern on proximal probe array block is modified.

However, FIG. 23 differs from FIG. 16B in the following manner. Whereas FIG. 16B depicted an illustration in which the electrostatic pattern that is exhibited on a proximal probe array block is modified by shifting the pattern of the electrostatic charges that are presented by the proximal probes, FIG. 23 illustrates an example in which the structure or the shape of the proximal probe array block is modified in order to modify the electrostatic pattern that is presented by the proximal probe array block. In the example that is shown in FIG. 23, proximal probe array block 2302 has self-contained element 2314 that may be controlled, e.g., by the components that are shown in FIG. 1, to change the shape or the structure of proximal probe array block 2302. As noted above, the inter-probe gaps or spacings between the proximal probes on a proximal probe array block may vary. In this example, a portion of the spacing or gap between a set of proximal probes is occupied by self-contained element 2314. When controlled to do so, element 2314 expands or contracts, thereby increasing or decreasing the inter-probe gap or spacing between the set of proximal probes that are juxtaposed to element 2314. As element 2314 expands, the juxtaposed proximal probes are moved, and the electrostatic pattern that is presented by those probes is modified; in this example, a portion of the electrostatic pattern is moved laterally. As the probes are moved, the captured molecule is manipulated.

Element 2314 may be a micro-mechanical structure, a nano-mechanical structure, or some other structure that is responsive to electronic control. Alternatively, assuming that the conductive wires/leads to the proximal probes are insulated within the proximal probe array block, element 2314 may comprise electro-active polymers or other electro-active materials that stretch, contract, or otherwise change shape or exhibit shape memory by the application of electric current to the electro-active material. As the electro-active materials expand or contract, the inter-probe gaps or spacings are enlarged or reduced, thereby providing flexibility in the substrate to match the structure of a targeted molecule in order to capture the targeted molecule or to cause the desired manipulation of a captured molecule. In one embodiment, multiple portions of the substrate of the proximal probe array block may comprise electro-active materials such that the different portions are individually controllable.

Figure 24A:
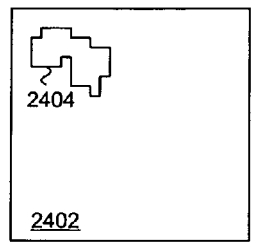
FIGS. 24A–24I depicts a set of diagrams that show multiple molecular manipulations using a proximal probe array block in accordance with an embodiment of the present invention.

With reference now to FIGS. 24A–24I, a set of diagrams depict multiple molecular manipulations using a proximal probe array block in accordance with an embodiment of the present invention. Although FIG. 13 depicts a flowchart in which a single loop through the flowchart represents a process for manipulating a single molecule, a sequence of multiple manipulations may be performed in series; the sequence of manipulations may be performed by repeating steps 1302–1310 that are shown in FIG. 13, sometimes omitting step 1312 as necessary when it is not desired to release a resulting molecule. FIGS. 24A-24I depicts an example of a series of molecular manipulations in which time progresses from a beginning state as shown in FIG. 24A to an ending state in FIG. 24I. Individual proximal probes or their respective areas are not represented within FIGS. 24A–24I.

FIG. 24A depicts a beginning state of proximal probe array block 2402; electrostatic pattern 2404 on proximal probe array block 2402 is represented by an outline of a subset of proximal probes, some of which present positive and negative electrostatic charges for capturing a target molecule. It may be assumed that electrostatic pattern 2404 has captured a first target molecule that will be manipulated in subsequent figures.

Figure 24B:
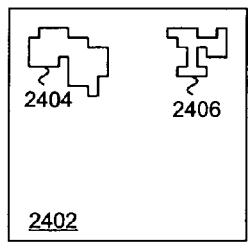

FIG. 24B depicts proximal probe array block 2402 at some later point in time; electrostatic pattern 2406 on proximal probe array block 2402 represents an outline of another subset of proximal probes which may be assumed to have captured a second target molecule that will be manipulated in subsequent figures.

Figure 24C:
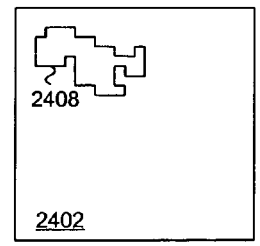

FIG. 24C depicts proximal probe array block 2402 at some later point in time; electrostatic pattern 2408 on proximal probe array block 2402 represents an outline of another subset of proximal probes. In this case, electrostatic pattern 2406 has been shifted in proximity with electrostatic pattern 2404 to cause a chemical reaction between the respective first and second captured molecules to form a third captured molecule; electrostatic pattern 2408 is employed to hold the third captured molecule.

Figure 24D:
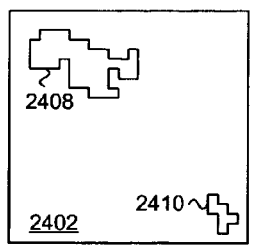
Figure 24E:
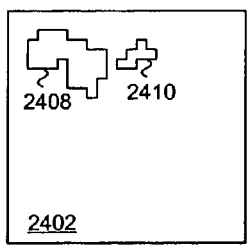

FIG. 24D depicts proximal probe array block 2402 at some later point in time; electrostatic pattern 2410 on proximal probe array block 2402 represents an outline of another subset of proximal probes which may be assumed to have captured a fourth molecule that will be manipulated in subsequent figures. FIG. 24E depicts proximal probe array block 2402 at some later point in time; electrostatic pattern 2410 on proximal probe array block 2402 has been moved and rotated to be in proximity with electrostatic pattern 2408 to cause a chemical reaction between the respective third and fourth captured molecules to form a fifth capture molecule, as shown in FIG. 24F in which electrostatic pattern 2412 is employed to hold the fourth captured molecule.

Figure 24F:
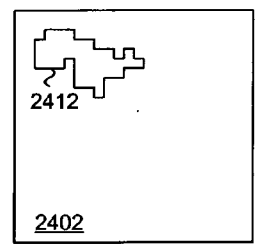
Figure 24G:
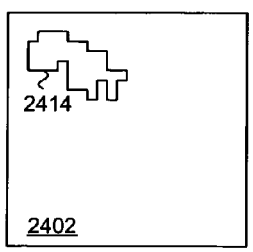
Figure 24H:
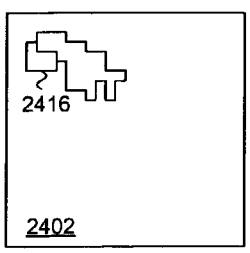
Figure 24I:
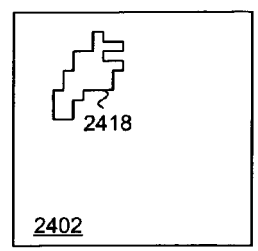

FIG. 24G depicts proximal probe array block 2402 at some later point in time; a portion of electrostatic pattern 2412 as shown in FIG. 24F has been shifted to form electrostatic pattern 2414 as shown in FIG. 24G. In so doing, it may be assumed that the fourth captured molecule has been twisted to some degree while being held by proximal probe array block 2402. FIG. 24H depicts proximal probe array block 2402 at some later point in time; a portion of electrostatic pattern 2414 as shown in FIG. 24G has been split to form electrostatic pattern 2416 as shown in FIG. 24H to prepare for the next molecular manipulation, which is shown at a later point in time in FIG. 24I. FIG. 24I depicts electrostatic pattern 2418, which is a remaining portion of electrostatic pattern 2416 that has been shifted and rotated; it may be assumed that the operations that are shown in FIGS. 24G-24I have split the fourth captured molecule at some desired location to form a fifth captured molecule. Proximal probe array block 2402 may hold the fifth captured molecule for some configurable period of time; the fifth captured molecule may be used in a subsequent molecular manipulation on proximal probe array block 2402, or the fifth captured molecule may undergo a chemical reaction with an uncaptured molecule within the reaction chamber that contains proximal probe array block 2402 while being observable with detectors on proximal probe array block 2402.

Hence, FIGS. 24A-24I illustrate a sequence of manipulations of multiple captured molecules at different points in time that results in the creation of a complex molecule, thereby constructing a complex molecule that might not be possible to construct using typical chemistry with free-floating reagents in a typical reaction chamber. Another advantage of the present invention is the ability to make molecules that are rarely observed or observed with great difficulty in a typical reaction chamber. In some cases, it might be possible to create a molecule of interest in a typical reaction chamber, but because of a very low rate of reaction, once the molecule of interest is free-floating within the reaction chamber, it may be very difficult to target for a subsequent reaction. With the present invention, the molecule of interest can be constructed and then held as a captured molecule in order to observe a subsequent reaction or to observe its general chemistry.

In a reverse fashion, a sequence of molecular manipulations may be performed on a molecule to disassemble a molecule rather than to assemble a molecule as shown in FIGS. 24A–24I. In each step of the disassembly procedure, a piece of a captured molecule may be removed, possibly with the help of one or more captured catalyst molecules that are brought into contact with the captured molecule through molecular manipulations.

The present invention may also be useful in analyzing the constituent pieces of a large molecule. For example, a large molecule might be created on a proximal probe array block using the assembly process that is shown in FIGS. 24A–24I. However, at the end of the procedure, the structure of the captured molecule might be unknown; the captured molecule might be held by the proximal probe array block using a large, empirically discovered, electrostatic pattern even though the exact structure of the captured molecule and its capture points might be unknown. By subjecting the large captured molecule to a series of molecular manipulations, smaller constituent pieces of the large captured molecule might be sequentially removed for subsequent analysis. The constituent pieces may then be shifted or otherwise moved to an isolated portion of the proximal probe array block or to another proximal probe array block, whereby the constituent pieces might be more readily analyzed, possibly using additional molecular manipulations. After determining the structure of the constituent pieces, the structure of the larger, originating molecule might be discernible.

Although the figures depict a single arrangement of one or more proximal probe array blocks for accomplishing a molecular manipulation or a sequence of molecular manipulations as if a reaction chamber contained only one such arrangement of proximal probe array blocks, it should be noted that multiple arrangements of proximal probe array blocks (most likely, identical arrangements of proximal probe array blocks) could perform a sequence of molecular manipulations in parallel, thereby generating multitudinous copies of one or more desired molecules. If large numbers of such arrangements of proximal probe array blocks could be implemented, a large quantity of a desired molecule could be manufactured. This large quantity of the desired molecule could then be used within conventional chemical reactions for a variety of purposes, such as for research, for industrial use, or for medicinal use.

Moreover, this embodiment of the present invention might be advantageous for producing sufficient quantities of a molecule that might otherwise be producible only in minute quantities with conventional chemistry. This embodiment of the present invention would be particularly advantageous in those cases in which minute quantities are too small to be useful, e.g., for studying statistical properties of reactions that include the molecule. In addition, the present invention might be cost-effective for producing sufficient quantities of certain valuable molecules that are otherwise cost-prohibitive to produce by conventional chemistry.

The advantages of the present invention should be apparent in view of the detailed description that has been provided above. Linear, areal, or volumed proximal probe array blocks can be fabricated by configuring proximal probes in one, two, or three dimensions, respectively. The proximal probe array blocks can be used to accomplish complex chemistry or biology that would not be possible using conventional techniques.

For example, a scientist may desire to cut a long chain molecule at a specific point. The scientist can target the chain molecule by programming the system of the present invention so that a proximal probe array block exhibits an electrostatic pattern that exerts electrostatic forces that attract the molecule's electrostatic properties that are inherently expressed by its molecular electron cloud. The proximal probe array block is then exposed to a liquid solution that contains the targeted molecule. One of the targeted molecules eventually moves near the proximal probe array block by thermal motion, and the complementary electrostatic charges on the targeted molecule are attracted to the proximal probes, thereby enabling the targeted molecule to be captured by the proximal probe array. Sensors on the proximal probe array block can detect the presence of the captured molecule, and the proximal probe array block can be used to manipulate the captured molecule in one or more of a variety of manipulation actions. For example, portions of the electrostatic pattern on the proximal probes can be shifted and/or rotated, thereby tearing the captured molecule at a specific chemical bond within the capture molecule and producing two captured molecules.

In a similar manner, different portions of the proximal probe array may be programmed to capture targeted molecules. The captured molecules are subsequently shifted and rotated to specific positions and orientations on the proximal probe array so that the captured molecules are close enough to engage in a chemical reaction that forms a new larger molecule, which is then released back into the liquid solution. In this manner, exotic chemical manipulations can be performed with a device that is fabricated in accordance with an embodiment of the present invention.

Exotic biological manipulations can also be accomplished with the present invention. In living beings, most biological processes are driven by DNA, RNA, other genetic molecules, and special proteins; all of these work on the principle of creating an electrostatic pattern of charges which closely match the complementary pattern of charges on the molecule to be manipulated. This causes the appropriate molecules to be attached to the enzyme, catalyst, or other molecule. In some instances, the molecules are cut, or the molecules are attached to other molecules by holding them together or by bending them apart. In the past, extremely laborious experiments would have to be carried out with many known catalysts, enzymes, etc., to discover one that performs the desired molecular manipulations, which may require many years of work. In addition, genetic techniques have been used to find genes which code for specific molecular transformations or functions, after which bacteria are engineered with the genes to produce chemicals that perform the desired molecular transformations or functions; this is also extremely laborious work.

The present invention provides programmable processes and programmable structures for accomplishing similar biological activities; for example, a captured molecule can act as an enzyme or a catalyst while the molecule remains captured by a proximal probe array. A scientist can program a desired molecular manipulation via electronic hardware, which can potentially eliminate the extremely laborious work. Furthermore, the present invention may be useful for testing for the presence of diseases, genes that predispose a person to certain problems, drugs, pollutants, viruses, bacteria, or other substances in blood or other bodily fluids. Inactive or non-threatening versions of disease-inducing molecules can be manufactured and introduced back into the body to that an immune system can create antibodies against the original harmful molecule. In addition, the present invention may be used to accomplish molecular manipulations that fold a molecular, particularly biological molecules, such as proteins. For example, amino acid chains coded by DNA can fold themselves in many different ways, and organisms usually have mechanisms to destroy or undo misfolded proteins. However, using this device, one would be able to force folding of such molecules to particular shapes in order to study the effects of such foldings or to obtain molecules that are either too difficult or not possible to obtain through natural biological processes.

It is important to note that while the present invention has been described such that it may be part of a data processing system; those of ordinary skill in the art will appreciate that some of the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A device for manipulating a molecule, the device comprising:
   a set of two or more proximal probes;
   a substrate, wherein the set of proximal probes are held by the substrate;
   a set of conductive wires that connect the set of proximal probes to controlling circuitry;
   first controlling circuitry for asserting an electrostatic pattern on the set of proximal probes to capture a molecule using electrostatic forces that are exerted by the electrostatic pattern; and
   second controlling circuitry for manipulating the molecule while the molecule remains captured by the set of proximal probes.

2. The device of claim 1 further comprising:
   an actuator, wherein the actuator is connected to the substrate such that the set of proximal probes can be manipulated as a single entity.

3. The device of claim 1 wherein the set of proximal probes are arranged substantially uniformly along one spatial dimension.

4. The device of claim 1 wherein the set of proximal probes are arranged substantially uniformly along two spatial dimensions.

5. The device of claim 1 wherein the set of proximal probes are arranged within three spatial dimensions.

6. The device of claim 1 further comprising:
   third controlling circuitry for detecting a capture of the molecule by the device.

7. The device of claim 6 wherein the proximal probes are used to detect a capture of the molecule.

8. The device of claim 1 further comprising:
   a set of one or more sensors, wherein the set of sensors are held by the substrate;
   a set of conductive wires that connect the set of sensors to controlling circuitry; and
   fourth controlling circuitry for detecting a capture of the molecule using the set of sensors.

9. The device of claim 1 further comprising:
   a first substrate and a first set of proximal probes forming a first proximal probe array block; and
   a second substrate and a second set of proximal probes forming a second proximal probe array block.

10. The device of claim 9 further comprising:
    a first actuator, wherein the first actuator is connected to the first substrate such that the first set of proximal probes can be manipulated as a single entity; and
    a second actuator, wherein the second actuator is connected to the second substrate such that the second set of proximal probes can be manipulated as a single entity, and wherein the second actuator can be manipulated independently from the first actuator.

11. The device of claim 9 further comprising:
    means for juxtaposing the first proximal probe array block and the second proximal probe array block such that a first molecule captured by the first proximal probe array block is able to chemically react with a second molecule captured by the second proximal probe array block.

12. The device of claim 9 further comprising:
    means for juxtaposing the first proximal probe array block and the second proximal probe array block such that the first proximal probe array block and the second proximal probe array block are able to capture a molecule.

13. The device of claim 9 further comprising:
    means for moving the first proximal probe array block independently from the second proximal probe array block such that a molecule that was captured by the first proximal probe array block and the second proximal probe array block experiences a physical force that is caused by movement of the first proximal probe array block or the second proximal probe array block.

14. The device of claim 9 further comprising:
    means for opposing the first proximal probe array block with the second proximal probe array block such that a first molecule captured by the first proximal probe array block is able to chemically react with a second molecule captured by the second proximal probe array block.

15. The device of claim 1 wherein a proximal probe in the set of proximal probes includes a cantilevered structure.

16. The device of claim 1 wherein at least two proximal probes in the set of proximal probes include a cantilevered structure, further comprising:
    means for flexing independently at least two of the proximal probes in the set of proximal probes to exert a physical force on the molecule while the molecule remains captured by the set of proximal probes.

17. The device of claim 1 wherein at least two of the proximal probes have differing lengths.

18. The device of claim 1 wherein the substrate has a non-planar shape.

19. The device of claim 1 wherein the substrate contains a memory shape material.

20. The device of claim 1 further comprising:
    an inter-probe portion of the substrate, wherein the inter-probe portion of the substrate can be electrically controlled to expand or to contract in order to increase or decrease an inter-probe spacing.

21. The device of claim 20 wherein the inter-probe portion of the substrate is a micro-mechanical mechanism.

22. The device of claim 20 wherein the inter-probe portion of the substrate is a nano-mechanical mechanism.

23. The device of claim 20 wherein the inter-probe portion of the substrate is an electro-active material.

24. The device of claim 1 wherein a proximal probe is a nanotube.

25. The device of claim 1 wherein a proximal probe comprises polymers.

26. A device for manipulating a molecule, the device comprising:
    a set of conductive wires that connect a set of two or more proximal probes to controlling circuitry;
    a first substrate and a first set of proximal probes forming a first proximal probe array block;
    a second substrate and a second set of proximal probes forming a second proximal probe array block;
    first controlling circuitry for asserting an electrostatic pattern on a set of proximal probes to capture a molecule using electrostatic forces that are exerted by the electrostatic pattern;
    second controlling circuitry for manipulating the molecule while the molecule remains captured by a set of proximal probes; and
    means for juxtaposing the first proximal probe array block and the second proximal probe array block such that a first molecule captured by the first proximal probe array block is able to chemically react with a second molecule captured by the second proximal probe array block.

27. A device for manipulating a molecule, the device comprising:
    a set of conductive wires that connect a set of two or more proximal probes to controlling circuitry;
    a first substrate and a first set of proximal probes forming a first proximal probe array block;
    a second substrate and a second set of proximal probes forming a second proximal probe array block;
    first controlling circuitry for asserting an electrostatic pattern on a set of proximal probes to capture a molecule using electrostatic forces that are exerted by the electrostatic pattern;
    second controlling circuitry for manipulating the molecule while the molecule remains captured by a set of proximal probes; and
    means for moving the first proximal probe array block independently from the second proximal probe array block such that a molecule that was captured by the first proximal probe array block and the second proximal probe array block experiences a physical force that is caused by movement of the first proximal probe array block or the second proximal probe array block.

* * * * *